(12) United States Patent
Haroon et al.

(10) Patent No.: US 12,411,090 B2
(45) Date of Patent: Sep. 9, 2025

(54) ELECTROCHEMICAL SENSOR FOR DETECTING HYDROXYCARBAMIDE

(71) Applicant: KING FAHD UNIVERSITY OF PETROLEUM AND MINERALS, Dhahran (SA)

(72) Inventors: Muhammad Haroon, Dhahran (SA); Abdulaziz Abdulrahman Al-Saadi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 425 days.

(21) Appl. No.: 18/185,072

(22) Filed: Mar. 16, 2023

(65) Prior Publication Data

US 2024/0310287 A1 Sep. 19, 2024

(51) Int. Cl.
*G01J 3/44* (2006.01)
*B82Y 30/00* (2011.01)
*G01N 21/65* (2006.01)

(52) U.S. Cl.
CPC ............ *G01N 21/658* (2013.01); *B82Y 30/00* (2013.01); *G01J 3/44* (2013.01)

(58) Field of Classification Search
CPC ...... G01N 21/658; G01N 27/26; G01N 27/30; G01N 33/553; B82Y 30/00; G01J 3/44
See application file for complete search history.

(56) References Cited

U.S. PATENT DOCUMENTS

| | | | |
|---|---|---|---|
| 7,022,288 B1 * | 4/2006 | Boss | B82Y 15/00 436/151 |
| 8,592,226 B2 * | 11/2013 | Van Duyne | B82Y 30/00 435/14 |
| 8,858,883 B2 | 10/2014 | Downling et al. | |
| 2009/0178925 A1 * | 7/2009 | Hahn | G01N 27/49 204/412 |
| 2011/0082412 A1 * | 4/2011 | Hyde | A61M 5/14276 604/20 |
| 2016/0178618 A1 * | 6/2016 | Freyer | C12M 25/16 435/7.1 |

FOREIGN PATENT DOCUMENTS

| | | | |
|---|---|---|---|
| CN | 114113031 A | 3/2022 | |
| EP | 2469598 A2 * | 6/2012 | ............. G01N 21/27 |
| IN | 202041050283 | 5/2022 | |
| WO | 2022/137238 A1 | 6/2022 | |

OTHER PUBLICATIONS

Pytlik et al.; Biological synthesis of gold nanoparticles by the diatom Stephanopyxis turris and in vivo SERS analyses; Algal Research 28; 2017; 7 Pages.

* cited by examiner

*Primary Examiner* — Abdullahi Nur
(74) *Attorney, Agent, or Firm* — Oblon, McClelland, Maier &Neustadt, L.L.P.

(57) ABSTRACT

A method of detecting an hydroxycarbamide in a solution including contacting an electrochemical sensor with the solution, where the electrochemical sensor includes gold coated copper oxide circular nanoplates and a substrate. The gold coated copper oxide circular nanoplates are coated on the substrate. The method further includes applying a potential and irradiating the electrochemical sensor in the solution, and measuring a Raman signal of the electrochemical sensor in the solution. The intensity of the Raman signal correlates with the amount of hydroxycarbamide in the solution.

19 Claims, 18 Drawing Sheets

ELECTROCHEMICAL SENSOR FOR DETECTING HYDROXYCARBAMIDE

The support of the Deputyship for Research and Innovation-Ministry of Education, Kingdom of Saudi Arabia for this research through a grant (DF191043) under the Institutional Funding Committee at King Fahd University of Petroleum and Minerals, Kingdom of Saudi Arabia is gratefully acknowledged.

BACKGROUND

Technical Field

The present disclosure is directed to an electrochemical sensor and particularly relates to a method of detecting hydroxycarbamide compounds with an electrochemical sensor.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Hydroxycarbamide (HC), a derivative of urea, represented by Formula 1 below, is a non-alkylating antineoplastic agent used in the treatment of a wide range of tumors, including breast, gastric and intestinal cancers, as well as bladder, and colorectal cancer, melanoma, hepatocellular carcinoma, and myeloproliferative diseases. Its most commonly accepted action mechanism is inhibiting the synthesis of DNA by affecting the cell cycle in a reversible manner. However, there are adverse effects of HC due to its high toxicity towards normal (non-cancerous) cells in addition to the rapid impairment of spermatogenesis in males. Furthermore, HC has a low dissolution capacity and low efficacy in in-vivo tests. These detrimental impacts could be reduced by developing a sensitive platform which has the potential of monitoring trace amounts of HC.

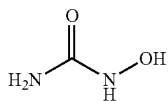

Formula 1

Several analytical techniques have been developed in the past for qualitative and quantitative drug detection of the drug. Conventional HC detection methods include separation and spectroscopy techniques, such as high-performance liquid chromatography (HPLC), LC-MS/MS, gas chromatography with mass spectrometry (GC-MS), nuclear magnetic resonance (NMR) and others. Since the structure of HC includes electrostatically active groups, electrochemical methods are a possible approach for trace level determination. Electrochemical sensors modified with a specific coating on the working electrode can result in a built-in selectivity toward target molecules of interest.

Although Raman spectroscopy is a well-established detection tool for different types of biofluids and is known for its non-destructive, reagent-free and rapid analysis advantages, its effective utilization is hindered due to the weak nature of its scattered light. The signal of the detailed Raman fingerprints of target analytes can be increased using surface enhanced Raman scattering (SERS). In Raman spectroscopy, the sample is illuminated with light, and a small portion of the photons will scatter at a different frequency than the incident light, called the Raman effect. These different frequency photons can give insight to vibrational energy modes of a sample, however due to the small portion of Raman scattering, the signal is inherently low. In SERS, the sample is typically on a solid substrate in combination with noble metal particles. These noble metal particles help to enhance the SERS signal by absorbing light and generating a localized electromagnetic (EM) field. In SERS the intensities of normal peaks are several-fold improved with a short acquisition time by employing a nanostructured metal surface. For this reason, the development of new nanostructured metallic materials with tuned photoelectric properties can increase the efficacy of SERS sensing platforms.

Desired optical properties can be also achieved by combining two different plasmonic metals in a bimetallic nanostructured material. Semiconductor oxide materials, such as $TiO_2$, $CuO_2$ and $ZnO$, were shown to contribute to the Raman enhancement factor (EF) up to $10^6$ [L. Yang, X. Jiang, et.al., Observation of Enhanced Raman Scattering for Molecules Adsorbed on $TiO_2$ Nanoparticles: Charge-Transfer Contribution, J. Phys. Chem. C. 112 (2008) 20095-20098]. Also, semiconductors with transition metals, mainly Au and Ag, exhibit a strong Raman response by inducing the charge transfer at their interface [D. Y. Lei, J. Li, H. C. Ong, Tunable surface plasmon mediated emission from semiconductors by using metal alloys, Appl. Phys. Lett. 91 (2007) 021112]. An ultrasensitive analytical protocol is still required to gain the desired enhancement in the Raman signals corresponding to a lower detection limit.

However, a challenge still exists in fabricating an electrochemical sensor with excellent electrocatalytic and sensing properties for hydroxycarbamide detection by SERS approach. Accordingly, an object of the present disclosure is to provide an electrochemical-surface enhanced Raman scattering (EC-SERS) sensor that can detect HC at low concentrations by Raman spectroscopy. It is another object of the present disclosure is to provide an EC-SERS sensor that can selectively detect HC.

SUMMARY

In an exemplary embodiment, a method of detecting an hydroxycarbamide in a solution is described. The method includes contacting an electrochemical sensor with the solution; applying a potential across and irradiating the electrochemical sensor in the solution; measuring a Raman signal of the electrochemical sensor in the solution, wherein an intensity of the Raman signal correlates with an amount of hydroxycarbamide in the solution. The electrochemical sensor includes gold coated copper oxide circular nanoplates; and a substrate, wherein the gold coated copper oxide circular nanoplates are coated on the substrate.

In some embodiments, the gold coated copper oxide circular nanoplates have an average diameter of 10 to 100 nanometers (nm).

In some embodiments, the gold coated copper oxide circular nanoplates have an average diameter of 40 to 60 nm.

In some embodiments, the gold coated copper oxide circular nanoplates are aggregated.

In some embodiments, aggregates of the gold coated copper oxide circular nanoplates are at least 500 nm in size.

In some embodiments, the aggregates of the gold coated copper oxide circular nanoplates are 500-5,000 nm in size.

In some embodiments, the gold coated copper oxide circular nanoplates include CuO and $Cu_2O$.

In some embodiments, a surface of the gold coated copper oxide circular nanoplates has amine, hydroxyl, and/or carbonyl groups.

In some embodiments, the hydroxycarbamide interacts with the gold coated copper oxide circular nanoplates via hydrogen bonding.

In some embodiments, the substrate is selected from the group consisting of fluorine-doped tin oxide (FTO), indium tin oxide (ITO), and aluminum zinc oxide (AZO).

In some embodiments, the electrochemical sensor has a charge transfer resistance of 0.5-1.5 kilo ohm (kΩ).

In some embodiments, the method includes irradiating the electrochemical sensor with 600-700 nm light.

In some embodiments, the Raman signal is monitored from 400-2,000 inverse centimeters ($cm^{-1}$).

In some embodiments, a C—N bond in the Raman signal is monitored from 950-1,000 $cm^{-1}$.

In some embodiments, the potential is 0.7-1.1 volts (V).

In some embodiments, the intensity of the Raman signal linearly correlates with the amount of hydroxycarbamide in the solution.

In some embodiments, the method includes quantifying the amount of hydroxycarbamide in the solution based on the intensity of the Raman signal.

In some embodiments, a limit of detection of hydroxycarbamide is up to 1 nanomolar (nM).

In some embodiments, a linear dynamic range of hydroxycarbamide is 0.1 M-10 nM.

The foregoing general description of the illustrative present disclosure and the following detailed description thereof are merely exemplary aspects of the teachings of this disclosure and are not restrictive.

BRIEF DESCRIPTION OF DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
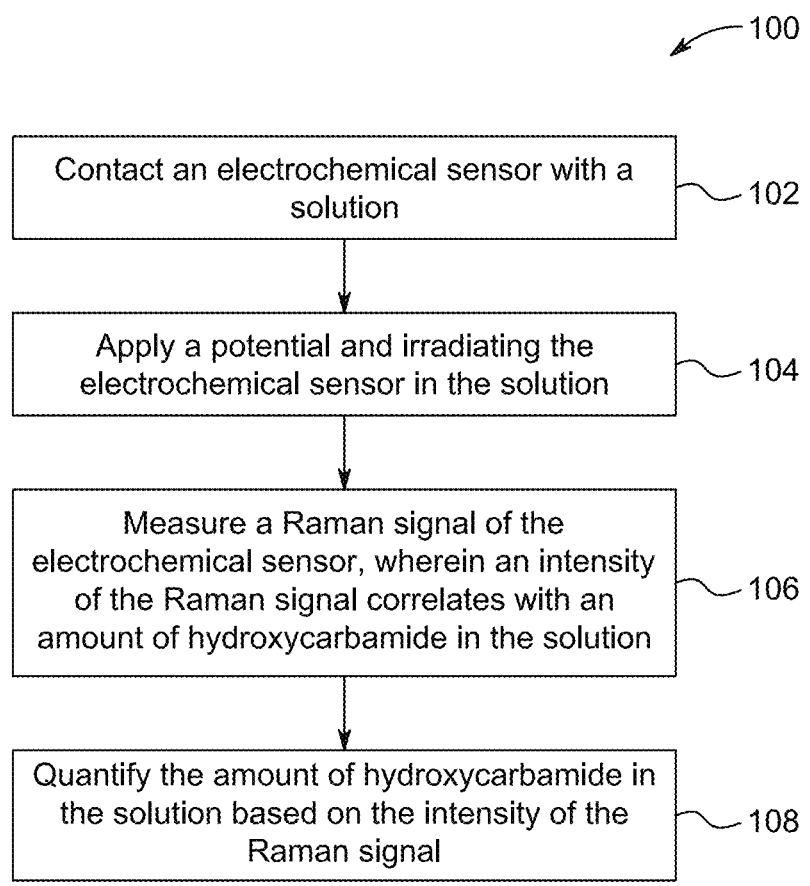
FIG. 1 is a flowchart of a method of detecting hydroxycarbamide (HC) in a solution, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

All ranges disclosed herein are inclusive of the endpoints, and the endpoints are independently combinable with each other, and inclusive of all intermediate values of the ranges. Thus, ranges articulated within this disclosure, e.g. numerics/values, shall include disclosure for possession purposes and claim purposes of the individual points within the range, sub-ranges, and combinations thereof.

As used herein, the term "Raman scattering" refers to inelastic scattering of a photon incident on a molecule, more particularly, to a process that produces light of frequency other than the frequency of the incident light.

As used herein, the term "Surface-enhanced Raman scattering" or "SERS" refers to a phenomenon that occurs when a Raman scattering signal, or intensity, is enhanced when a Raman-active molecule is adsorbed on or in close proximity to a metal surface.

As used herein, the terms "nanoparticle" and "NP" are used interchangeably and are intended to refer to a particle having at least one dimension in the range of about 1 nm to about 1000 nm.

Aspects of the present disclosure are directed to gold coated copper oxide (Au—$CuO_x$) circular nanoplates (CNPs) on an electrochemical surface enhanced Raman scattering (EC-SERS) substrate for the detection of anticancer drug hydroxycarbamide (HC). The Au—$CuO_x$ CNP substrate was characterized using various spectroscopic and imaging techniques including XRD, XPS, FTIR and FESEM.

The electrochemical sensor, also referred to as the sensor or EC-SERS sensor, includes a substrate, and copper oxide nanoparticles or "nanoparticles" distributed on the surface of the substrate. In some embodiments, the substrate includes silicon, polymer, glass, silicon nitride, quartz, ceramics, sapphire, metal, or a combination thereof. In some embodiments, the substrate includes glass and a coating of a metal selected from the group consisting of gold, silver, aluminum, copper, platinum, and alloy thereof. In some embodiments, the substrate is selected from the group consisting of fluorine-doped tin oxide (FTO), indium tin oxide (ITO), and aluminum zinc oxide (AZO). In a preferred embodiment, the substrate is an FTO-coated glass.

The substrate is further immobilized/coated with copper oxide nanoparticles. In some embodiments, the nanoparticles are coated onto the substrate by any method known in the art including, drop casting, spin coating, doctor blading or using an automatic coating instrument. In an embodiment, the nanoparticles are coated on at least 50% of an outer surface of the substrate, preferably at least 60%, 70%, 80%, 90%, or 100%. In an embodiment, the thickness of the coating of the nanoparticles on the substrate is 10 to 500 nm, preferably 20 to 450 nm, 30 to 400 nm, 40 to 350 nm, 50 to 300 nm, 60 to 250 nm, 70 to 200 nm, 80 to 150 nm, or 90 to 100 nm.

In some embodiments, the nanoparticles include CuO and $Cu_2O$, thereby the nanoparticles include both $Cu^+$ and $Cu^{2+}$. In some embodiments, the ratio of $Cu^+$ to $Cu^{2+}$ is 1-10 to 1-10, preferably 1 to 10, 1 to 5, 1 to 2, 1 to 1, 2 to 1, 5 to 1, or 10 to 1. In an embodiment, the nanoparticles include only one of CuO and $Cu_2O$.

In a preferred embodiment, the copper oxide nanoparticles are coated with at least one noble metal such as ruthenium, copper, rhodium, palladium, gold, silver, platinum, or alloys thereof (e.g., copper-silver alloy, copper-gold alloy, silver-gold alloy, copper-silver-gold alloy). In a preferred embodiment, the nanoparticles are gold coated copper oxide nanoparticles. In some embodiments, the nanoparticles have metallic gold, $Au^0$. In some embodiments, the gold coated copper oxide nanoparticles have a (200) gold diffraction peak at 43 to 45°, preferably 43.5 to 44.5°, a gold (220) peak at 63 to 65°, preferably 63.5 to 64.5°, a gold (311) peak at 77 to 79°, preferably 77.5 to 78°, a CuO (111) at 34 to 38°, preferably approximately 36°, an Au—Cu (111) peak at 37 to 39°, preferably 37.5 to 38°, an Au—Cu (311) peak at 81 to 83°, preferably 81.5 to 82°, a $Cu_2O$ (210) peak at 28 to 30°, preferably approximately 29°, a $Cu_2O$ (400) peak at 60 to 62°, preferably approximately 61°, and a Cu peak at 72 to 74° or approximately 73°. In some embodiments, peaks of the CuO, $Cu_2O$ overlap with peaks of the Au due to the coating of the Au on the copper oxide nanoparticles. Such nanoparticles have a homogeneous distribution of gold and copper atoms. In an embodiment, at least 80% of an outer surface of the copper oxide nanoparticles are coated with gold, preferably 85%, 90%, 95%, or 100%.

In general, the nanoparticles can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplates, nanodisks, rods (also known as nanorods), and mixtures thereof. In some embodiments, the nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanoparticles having a different shape. As used herein, the term "non-uniform shape" refers to an average consistent shape that differs by more than 10% of the distribution of nanoparticles having a different shape. In a preferred embodiment, the nanoparticles are in the form of nanoplates.

The gold coated copper oxide nanoplates are circular in shape with an average diameter of 10 to 100 nm, more preferably 20 to 90 nm, 30 to 80 nm, 40 to 60 nm, or approximately 50 nm. In some embodiments, the gold coated copper oxide circular nanoplates are aggregated on the substrate. In some embodiments, aggregates of the gold coated copper oxide circular nanoplates are at least 500 nm in size, wherein the size refers to the longest dimension of the aggregate. In some embodiments, the aggregates of the gold coated copper oxide circular nanoplates are 500-5,000 nm in size, preferably 1,000 to 4,500 nm, 1,500 to 4,000 nm, 2,000 to 3,500 nm, or 2,500 to 3,000 nm.

In some embodiments, the nanoparticles include several functional groups, such as amine, hydroxyl, and/or carbonyl groups, on their surface. These functional groups help to stabilize and immobilize the nanoparticles onto the substrate. In some embodiments, the electrochemical sensor further includes a linker for tethering the substrate with the nanoparticles. For example, the surface of the substrate can be modified with a linker such as a sulfide, or glycol which can interact with the functional groups on the surface of the nanoparticles.

The EC-SERS sensor of the present disclosure finds application in detecting hydroxycarbamide. Although the description and the examples herein provided refer to the use of the electrochemical sensor for the detection of hydroxycarbamide, it may be understood by a person skilled in the art that the electrochemical sensor may also be used for the detection of other target analytes as well, albeit with a few variations, as may be obvious to a person skilled in the art.

Referring to FIG. 1, a flow chart of a method 100 of detecting hydroxycarbamide in a solution is illustrated. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes contacting an electrochemical sensor with a solution. To detect the presence of hydroxycarbamide (HC) in the solution, the electrochemical sensor is brought in contact with a solution, for example by submerging the sensor in the solution. In some embodiments, the solution has an amount of dissolved hydroxycarbamide. In some embodiments, the hydroxycarbamide interacts with the gold coated copper oxide circular nanoplates. In some embodiments, the hydroxycarbamide interacts/adsorbs onto the substrate with the gold coated copper oxide circular nanoplates via hydrogen bonding and/or charge transfer interactions. In some embodiments, the H-bonding occurs between an H atom of the HC and O atom of Au—CuO. In the NH . . . CuO—Au . . . OH interaction mode, the HC interacts with the bimetallic system via the copper and/or gold.

At step 104, the method 100 includes applying a potential and irradiating the electrochemical sensor in the solution. In some embodiments, the irradiating and applying potential are performed simultaneously or sequentially. During this process, a potential, in a range of 0.7-1.1 V, preferably 0.8 to 1.0 V more preferably 0.9 V, is applied across the electrodes, and the electrochemical sensor is irradiated with laser light, at a pre-determined wavelength. The power of the laser excitation is adjustable depending on factors such as the plasmon properties of the nanoparticles and the substance to be detected. In some embodiments, the electrochemical sensor is irradiated with a laser light having a wavelength of 600-700 nm, preferably from 625 to 675 nm, and more particularly at about 633 nm. The irradiation is performed for a time sufficient period of time to generate a Raman signal. In some exemplary embodiments, the period of time ranges from less that about 1 second to about 3 hours, preferably 10 seconds to 5 minutes. Raman spectroscopy is then measured on the electrochemical sensor based on the radiation scattered by the substance, HC, in the solution that is adsorbed onto the sensor.

At step 106, the method 100 includes measuring a Raman signal of the electrochemical sensor. In an embodiment, the Raman signal is a SERS signal. In an embodiment, the SERS spectrum is recorded with a Raman spectrometer. In a preferred embodiment, an intensity of the Raman signal correlates with an amount of hydroxycarbamide in the solution. The quantity of the HC present on the substrate is measured based on the received intensity of scattered radiation having a wavelength within one or more predetermined wavelength intervals. In an embodiment, the Raman signal is monitored from 400-2,000 $cm^{-1}$, preferably 600-1,500 $cm^{-1}$, or 800-1,000 $cm^{-1}$ In an embodiment, a C—N bond in the Raman signal of the HC is monitored from 950-1,000 $cm^{-1}$ preferably 960-990 $cm^{-1}$ or 970-980 $cm^{-1}$. The signal varies based on the concentration of the HC in the solution. The intensity of the Raman signal linearly correlates with the amount of HC in the solution.

At step 108, the method 100 includes quantifying the amount of hydroxycarbamide in the solution based on the intensity of the Raman signal. In other words, the higher the intensity of the signal, the greater the concentration of HC in the solution.

The electrochemical sensor has a charge transfer resistance of 0.5-1.5 kΩ, preferably 0.7 to 1.3 kΩ or approximately 1 kΩ, a limit of detection of hydroxycarbamide up to 1 nM, preferably 0.5 nM or 0.1 nM, and a linear dynamic range of hydroxycarbamide of 0.1 M-10 nM, preferably 1 M-1 nM, or 1 mM to 1 µM.

EXAMPLES

The disclosure will now be illustrated with working examples, which are intended to illustrate the working of disclosure and not intended to restrictively imply any limitations on the scope of the present disclosure. The working examples depict a method of detecting the hydroxycarbamide compound with the electrochemical sensor of the present disclosure.

Example 1: Chemicals and Reagents

Hydroxycarbamide ($NH_2CONHOH$, Purity 98%), copper nitrate ($Cu(NO_3)_2 \cdot 3H_2O$, Purity >99.8%), gold chloride trihydrate ($HAuCl_4 \cdot 3H_2O$, purity >99.8%), phosphate buffer solution (pH=7), and potassium chloride (KCl, Purity >99%) were obtained from Sigma-Aldrich. FTO conductive glass was purchased from SOLARONIX Switzerland, while sodium hydroxide (NaOH, Purity >99.6%), 2-propanol (purity >99.5%), ethanol (purity >99%), polyvinylpyrrolidone (PVP, MW=40000 g/mol), potassium ferricyanide ($K_3[Fe(CN)_6]$, purity >99%) were purchased from Merck. Hydrazine hydrate ($H_4N_2 \cdot H_2O$, 35%) and sodium borohydride (NaBH4, purity 98%) were obtained from Fisher Scientific. All chemical reagents were used as received without further purification.

Example 2: Synthesis of Copper Oxide Nanoplates (CNPs)

The $CuO_x$ nanoplates were synthesized by modifying the existing $Cu_2O$ sphere method reported by Pang et al. [M. Pang, H. C. Zeng, Highly ordered self-assemblies of sub-micrometer $Cu_2O$ Spheres and their hollow chalcogenide derivatives, Langmuir. 26 (2010) 5963-5970], incorporated herein by reference in its entirety. In this modified method, PVP was used as a shape-directing and capping agent, and hydrazine hydrate was used as a reducing agent in the alkaline copper ion solution in 2-propanol. Typically, a 1.0 mM solution of $Cu(NO_3)_2 \cdot 3H_2O$ was prepared in 120 mL 2-propanol solvent to which 0.5 g of PVP was added. A 1 mM-NaOH solution was added and stirred for 30 minutes, and the color changed from blue to green. After, 4.0 mL of $N_2H_4 \cdot H_2O$ (35%) was added dropwise to the above reaction mixture, and the color of the reaction mixture turned dark brown. The dark brown copper oxide nanoplates were coated with gold using a wet chemical process. 3 mL of 0.6 mM aqueous solution of $HAuCl_4$ was added, the reaction mixture was stirred for 20 minutes, then 3 mL of 5 mM $HAuCl_4 \cdot 3H_2O$ was added dropwise while stirring for a further 30-minute duration. Black precipitates formed and were centrifuged. The collected black product was washed with DI water and ethanol. The product was dried at room temperature for 12 hours, then for 2 hours in the oven at 40° C.

Example 3: Preparation of the Electrochemically Active FTO Electrode

The FTO-coated glass had a surface resistivity of 7 ohm/sq. It was cut into 1 $cm^2$ square-shaped pieces to fit in the EC-SERS compartment cell. The glass substrate was thoroughly cleaned with acetone, isopropanol, and deionized water, put in an ultrasonic treatment at 40° C., and dried at 50° C. for 20 minutes before the fabrication of $Au-CuO_x$ nanoplates. For the fabrication of the FTO substrate, a suspension of $Au-CuO_x$ CNPs was prepared by dispersing 12 mg nanomaterials in 5 ml deionized water and subjected to ultrasonication for 20 minutes. A drop casting method was used to fabricate the well-cleaned FTO substrate by casting 50 µL suspension of nanoplate materials uniformly on the conductive surface and then drying it in air. The fabricated FTO substrates were used for electrochemical characterization and EC-SERS analysis.

Example 4: CNPs Characterization Techniques

The $Au-CuO_x$ CNPs were characterized by several spectroscopic and imaging techniques. The samples for FE-SEM analysis were prepared using a conductive carbon tap on a special conductive sample holder. The aqueous solution of CNPs was drop-casted on the carbon tap and allowed the samples to dry in the air. FT-IR spectra were acquired using Thermo Scientific NICOLET 6700 spectrometer at a resolution of 4 $cm^{-1}$ with 64 scans. The sample pallets for their analysis were prepared by mixing the sample with KBr. The XRD analysis was performed on the Rigaku Ultima IV diffractometer using a copper K-α radiation source. The X-ray radiations were generated at 40 kW and 30 mA, and the scanning speed was set at 1.0 degree/min. The recorded diffractograms were interpreted using HighScore software. The XPS spectra were collected using a Scientific ESCALAB 250X spectrometer equipped with a monochromatic magnesium K-α source and helium discharge lamp. The samples were prepared by depositing aliquots of the sample solution on the clean glass slide at room temperature and then air-dried. The electrochemical characterization of the working Au—CuOx/FTO electrode was carried out using the Gamry workstation three-electrode system. The collected electrochemical spectra were processed using Gamry Echem Analyst. Raman analysis was conducted using a 633 nm excitation source LabRAM HR evolution microscope fitted with an electrical temperature-controlled CCD camera and He—Ne laser having power 17 mW with two auto-switched diffraction gratings 600 and 1800. Raman and SERS spectra were recorded at 20 sec acquisition time, 50% laser power, and a number of scans of 8, while a 50× lens of microscope was used to focus the sample. The ratio of 1:1 of drug and nanomaterials was managed to collect SERS spectra. The EC-SERS spectra were acquired using the three-electrode portable workstation system under the same Raman spectrophotometric conditions.

Example 6: Quantum Chemical Calculations

Figure 11:
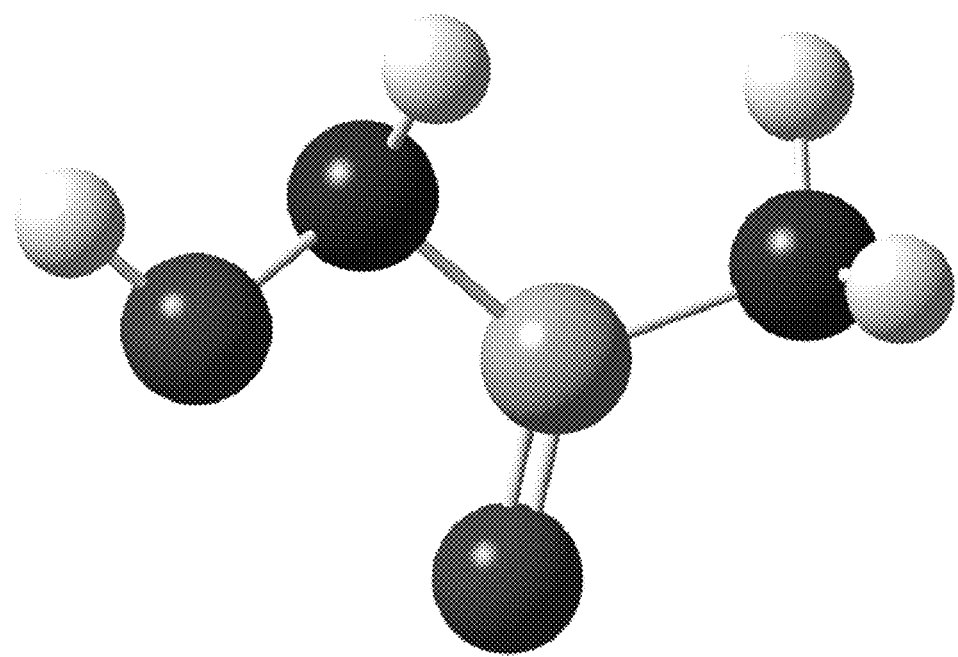
FIG. 11 is an illustration of an optimized geometry of hydroxycarbamide computed at the B3LYP functional using the 6-311+g(d,p) basis set, according to certain embodiments.
Figure 12:
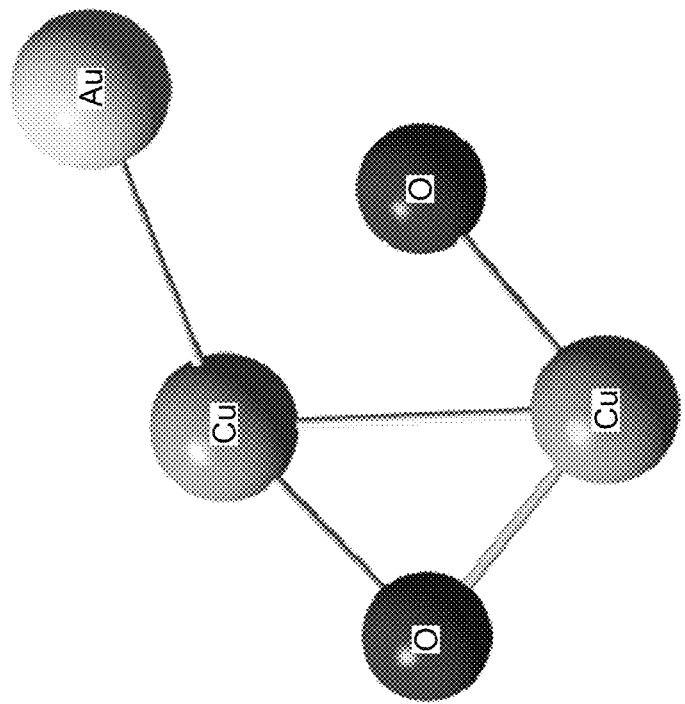
FIG. 12 is an illustration of an optimized geometry of the Au—$CuO_x$ nanomaterial models, namely Au—Cu2O & Au—CuO clusters, computed at the B3LYP functional with the SDD basis set for Au and Cu atoms and 6-311+g(d,p) basis set for 0 atoms, according to certain embodiments.
Figure 12:
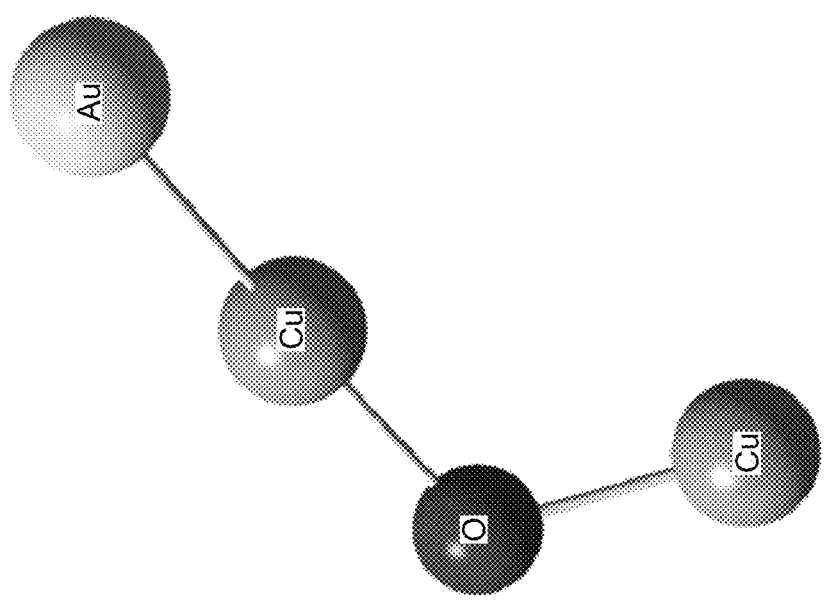
Figure 13:
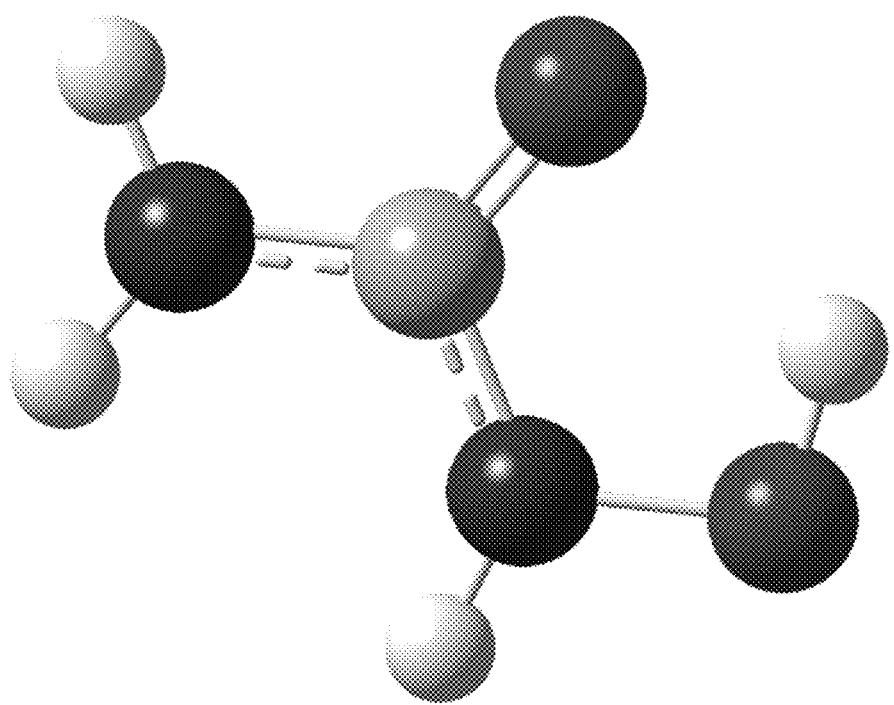
FIG. 13 is an illustration of an optimized geometry of hydroxycarbamide with Cs symmetry using the B3LYP functional and the 6-311+g(d,p) basis set, according to certain embodiments.

All calculations were carried out using Gaussian 09 program to establish the enhancement mechanism [A. D. Becke, A new mixing of Hartree-Fock and local density-functional theories, J. Chem. Phys. 98 (1993) 1372-1377], incorporated herein by reference in its entirety. The density functional theory (DFT) approach was employed with the hybrid B3LYP functional and the 6-311 g+(d,p) basis set for H, O, C, and N atoms and SDD for metal atoms. Such a cost-effective theoretical level was chosen to produce reasonable results compared to experimental findings [C. C. Nnadiekwe, I. Abdulazeez, M. Haroon, Q. Peng, A. Jalilov, A. Al-Saadi, Impact of Polypyrrole Functionalization on the Anodic Performance of Boron Nitride Nanosheets: Insights From First-Principles Calculations, Front. Chem. 9 (2021); and J.-H. Chang, M. Antunes, M. Umar, C. C. Nnadiekwe, M. Haroon, I. Abdulazeez, K. Alhooshani, A. A. Al-Saadi, Q. Peng, A First-Principles Study on the Multilayer Graphene Nanosheets Anode Performance for Boron-Ion Battery, Nanomater. 2022, Vol. 12, Page 1280. 12 (2022) 1280], incorporated herein by reference in its entirety. The geometry of HC was optimized, and its harmonic frequencies were computed (FIG. 11). As Au—CuOx represents a mixture of Cu(I) and Cu(II) based materials, two stable models of Au—CuO and Au—$Cu_2O$ nanoclusters were constructed and fully optimized (FIG. 12). The frequency calculations were performed to confirm the optimization convergence and to assign the vibrational modes of wavenumbers for the target drug molecule. Frequency calculation was also performed with Cs symmetry constraint (FIG. 13) to identify the more likely totally and non-totally symmetric modes which correspond to A' and A" irreducible representations, respectively, of the drug molecule. Furthermore, the adsorption of HC on the Au—CuOx models was investigated at the same level of theory, and the relevant adsorption energies and magnitude of charge transfer were obtained.

Example 7: CNPs and Sensor Characterization

Figure 2A:
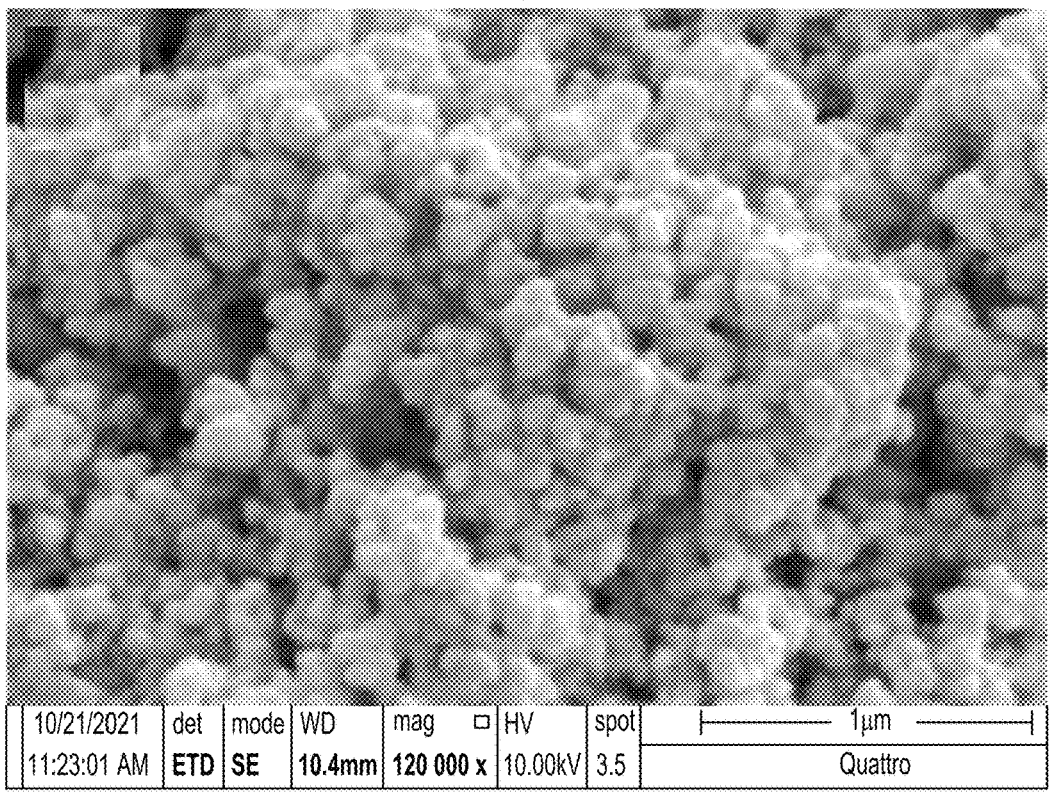
FIGS. 2A and 2B depict scanning electron microscope (SEM) images of $CuO_x$ nanoplates, at different magnifications, according to certain embodiments.
Figure 2B:
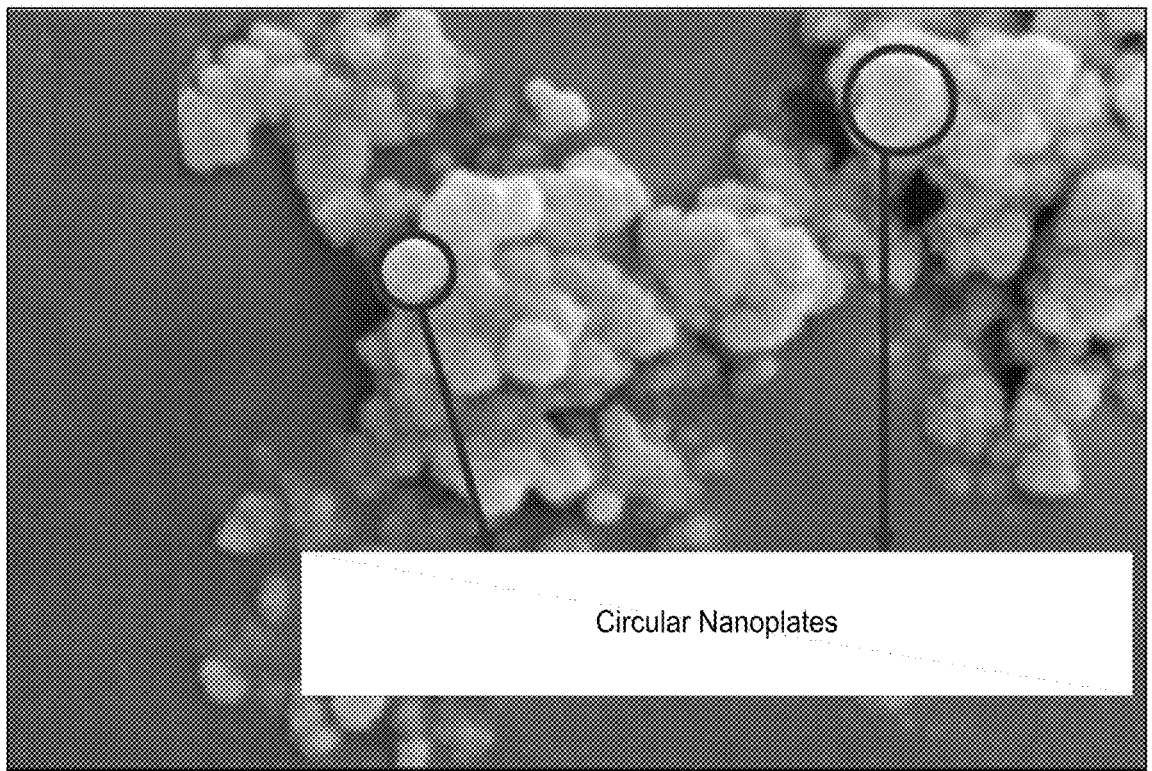
Figure 2C:
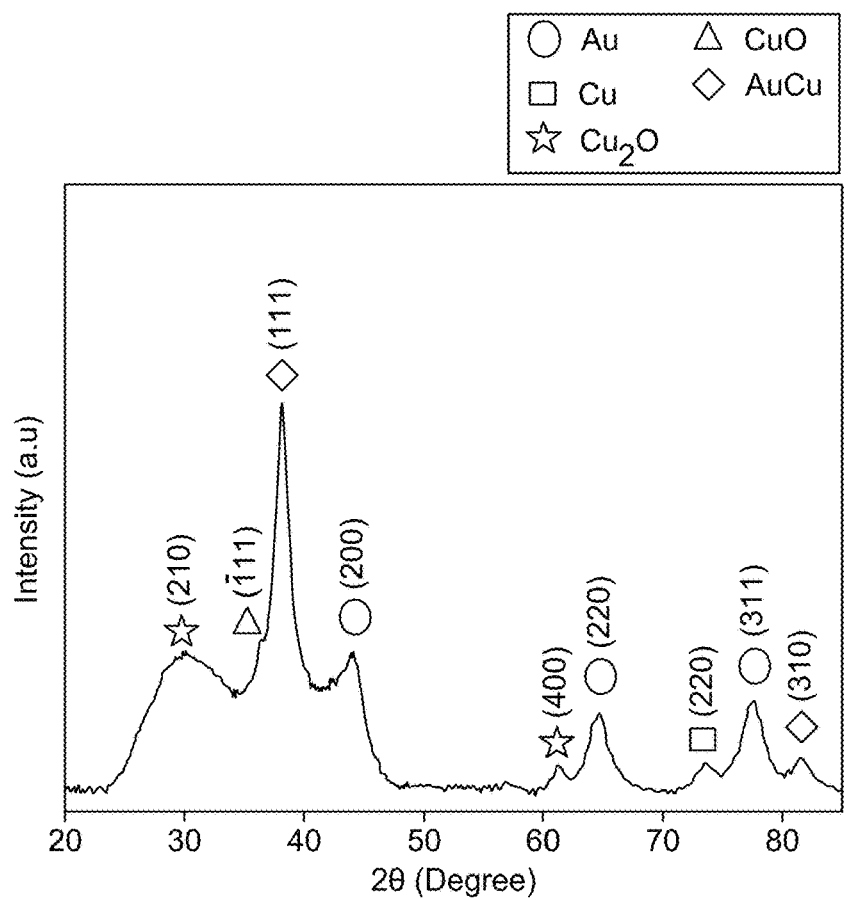
FIG. 2C is an X-ray diffraction (XRD) pattern of the $CuO_x$ nanoplates, according to certain embodiments.
Figure 2D:
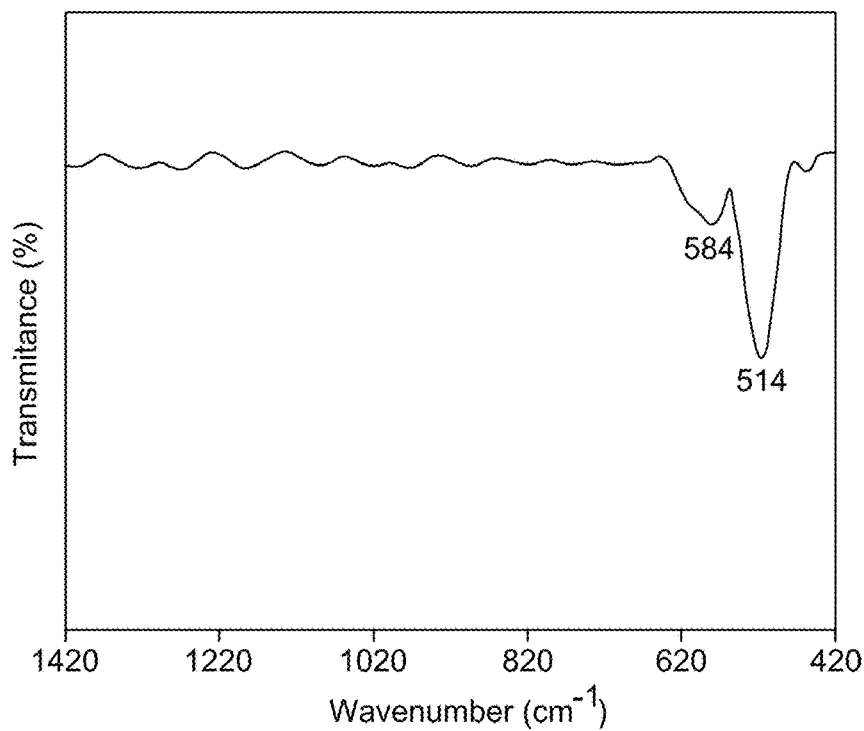
FIG. 2D shows a Fourier Transform Infrared (FT-IR) spectra of the $CuO_x$ nanoplates, according to certain embodiments.

A morphological analysis of the gold-coated copper oxide (Au—$CuO_x$) was conducted; the results of this study are depicted in FIG. 2A-B. The synthesized materials possessed a circular nanoplate (CNP) like structure, as revealed from the SEM images collected at different magnifications (FIG. 2A and FIG. 2B). The phase composition and types of crystallinities of Au—$CuO_x$ were explored using the XRD analysis, and the diffractogram of the prepared circular nanoplates is depicted in FIG. 2C. The characteristic diffraction peaks of gold were located at 44.5°, 64.6°, and 77.6°, representing the Miller indices (200), (220), and (311), respectively. The diffraction peak of CuO (−111) appeared at 36.3°, while those of the Au—Cu corresponding to (111) and (311) facets were observed at 38.2° and 81.8°, respectively. The $Cu_2O$ peaks with Miller indices (210) and (400) were located at 29.5° and 61.2°. The XRD band associated with copper was located at a 73.6° diffraction angle. Some XRD peaks of CuO (111, 200) at 35.7° and 41.6° and Cu$_2$O at 76.8° were superimposed under the Au diffraction peaks, which is evident of the gold being successfully coated over the copper oxide. Further, the infrared bands of metal oxide intra-atomic vibrations generally appeared below 1000 cm$^{-1}$. The formation of Au—CuO$_x$ was confirmed by the stretching vibration of Cu—O absorbing at 584 cm$^{-1}$, while the absorption band at 514 cm$^{-1}$ could be attributed to the Au—O vibration (FIG. 2D).

Figure 3A:
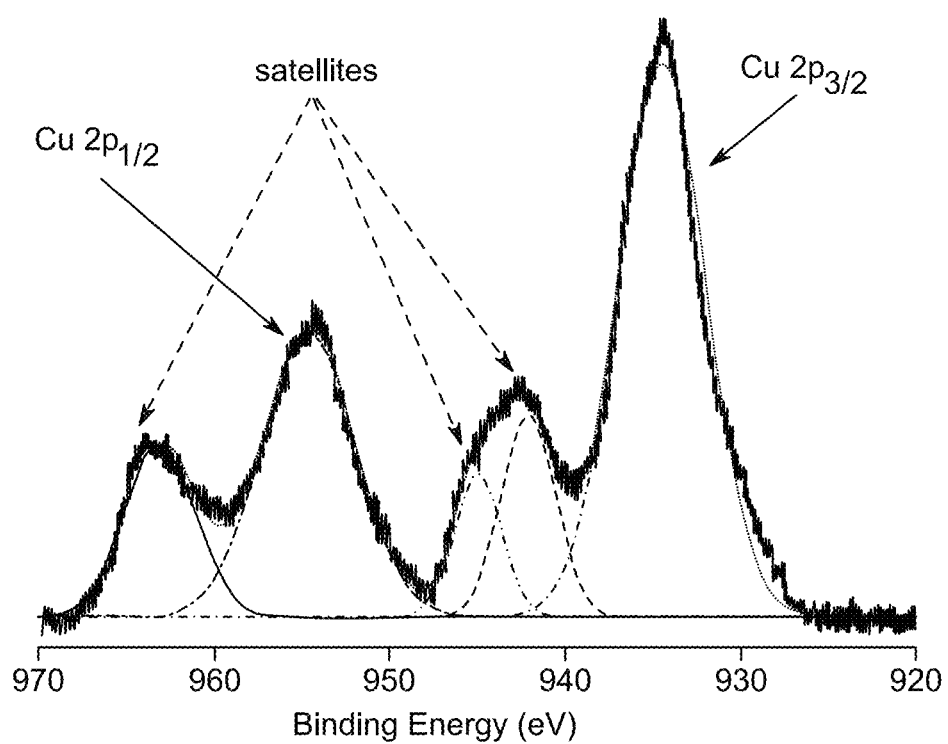
FIG. 3A illustrates a deconvoluted X-ray photoelectron spectroscopy (XPS) spectra describing Cu 2p levels in Au-coated $CuO_x$ nanoplates, according to certain embodiments.
Figure 3B:
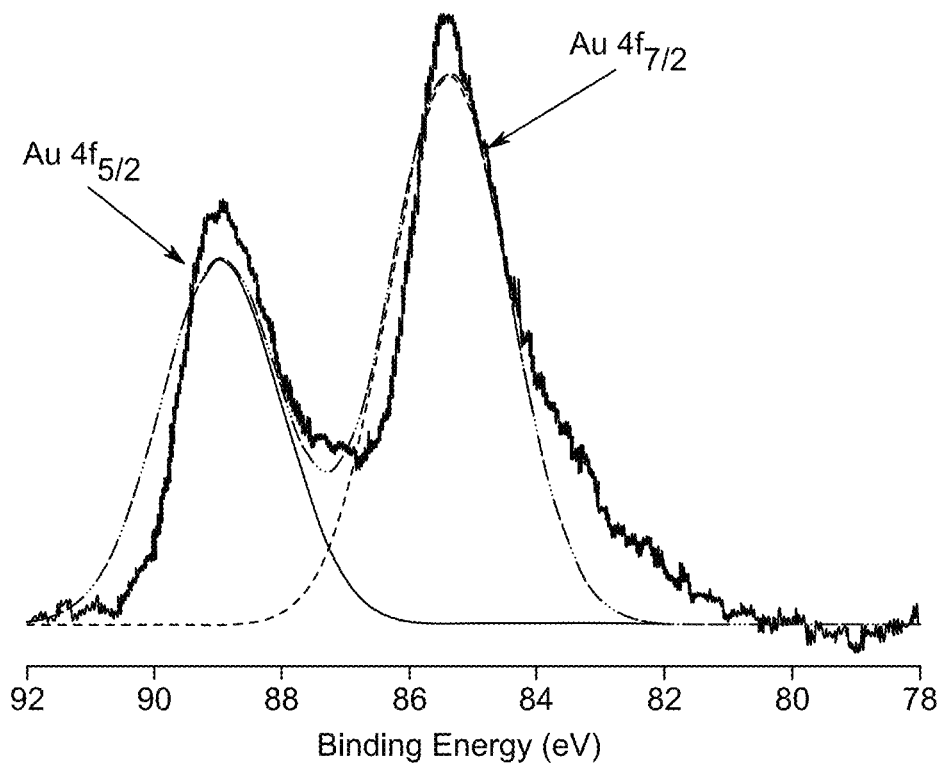
FIG. 3B illustrates spectra deconvoluted XPS spectrum describing Au 4f levels in the Au-coated $CuO_x$ nanoplates, according to certain embodiments.
Figure 3C:
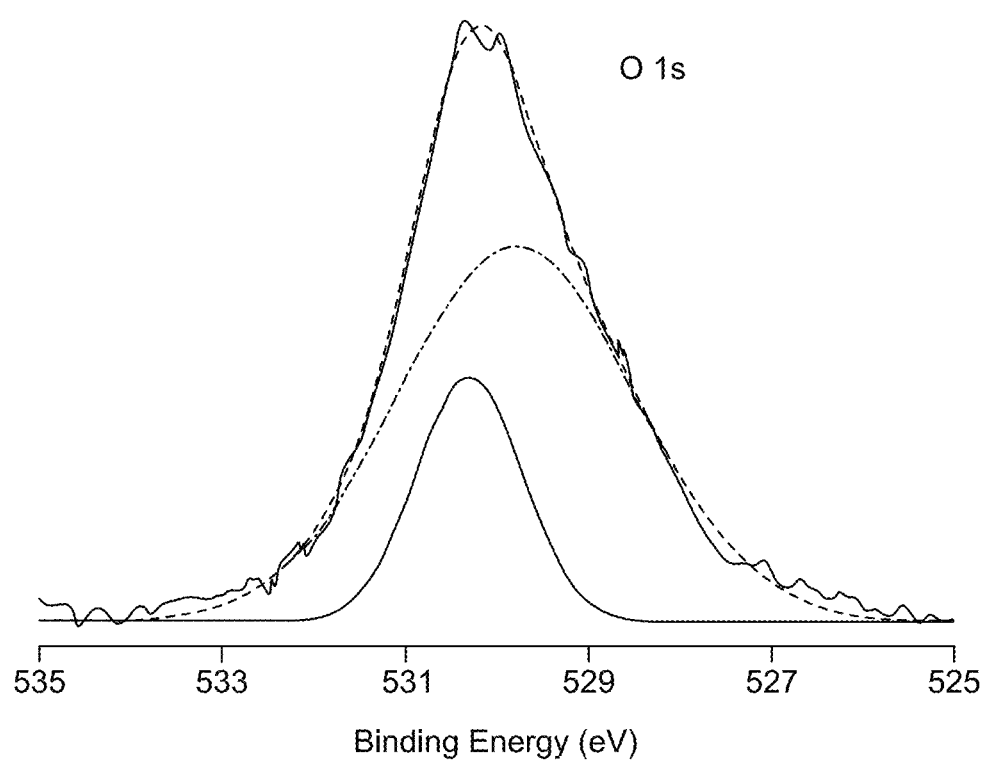
FIG. 3C illustrates a deconvoluted XPS spectrum describing O is levels in the Au-coated $CuO_x$ nanoplates, according to certain embodiments.

The chemical composition and oxidation states of Cu, Au, and O present in the synthesized circular nanoplates were obtained from the XPS data (FIG. 3A). The Cu 2p spectrum shows two peaks at 933.2 and 953.3 eV attributed to the p$_{3/2}$ and p$_{1/2}$ states, respectively. The broadness of these two peaks hints at the presence of both Cu$^+$ and Cu$^{2+}$ states in the synthesized nanomaterials. The triplet satellites peaks observed at 942, 945, 963 eV binding energies are ascribed to the CuO form. The spectrum of Au 4f (FIG. 3B) contains two peaks observed at 84.9 and 88.1 eV, which can be attributed to Au 4f$_{7/2}$ and Au 4f$_{5/2}$ states, respectively. These are the characteristics of the gold nanoparticles in the metallic state with zero oxidation state Au°. The O 1 s spectrum (FIG. 3C) is composed of two types of O species attributed to lattice oxygen atoms in the Cu$_2$O/CuO metal oxide combinations. The electrochemical activity of the fabricated FTO substrate was examined using a single-compartment electrochemical cell containing three electrodes: Pt wire as a counter electrode, Ag/AgCl as a reference electrode, and FTO substrate as a working electrode. The CV and EIS were employed to compare the fabricated and non-fabricated glass in a phosphate buffer solution containing 5.0 mM potassium ferricyanide as an electrochemical probe and 1.0 M potassium chloride as a supporting electrolyte. The EIS measurements were performed at an applied potential of 0.42 V in the frequency range of 100000-0.1 Hz at 10 mV rms amplitude.

Figure 4B:
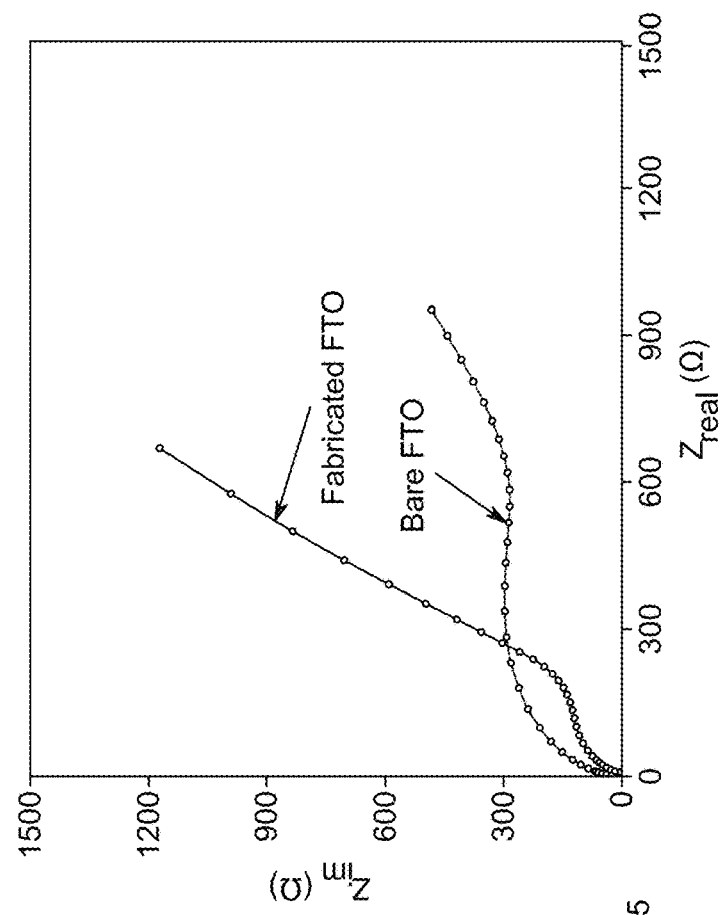
FIG. 4B illustrates electrochemical impedance spectroscopy (EIS) spectra obtained for the bare FTO and the Au—$CuO_x$ nanoplatelets (CNPs)/FTO in the phosphate buffer solution (0.1 M PBS: pH=6.60) containing 5.0 mM $K_3[Fe(CN)_6]$ and 1.0 M KCl, according to certain embodiments.
Figure 4A:
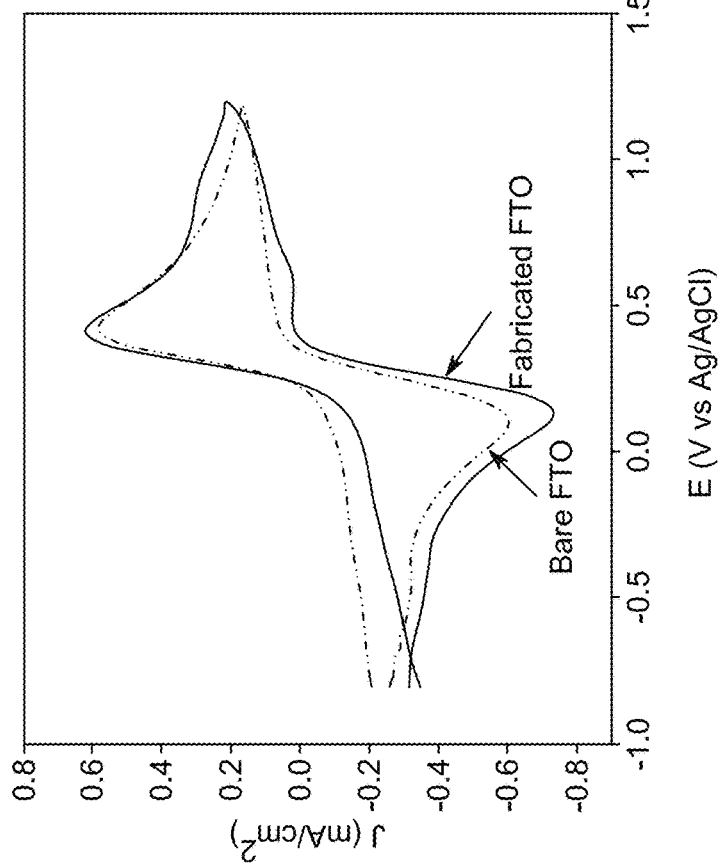
FIG. 4A is a cyclic voltammogram (CVs) obtained for bare FTO, and the Au—$CuO_x$ nanoplatelets (CNPs)/FTO in phosphate buffer solution (0.1 M PBS: pH=6.60) containing 5.0 mM $K_3[Fe(CN)_6]$ and 1.0 M KCl, according to certain embodiments.
Figures 5A, 5B:
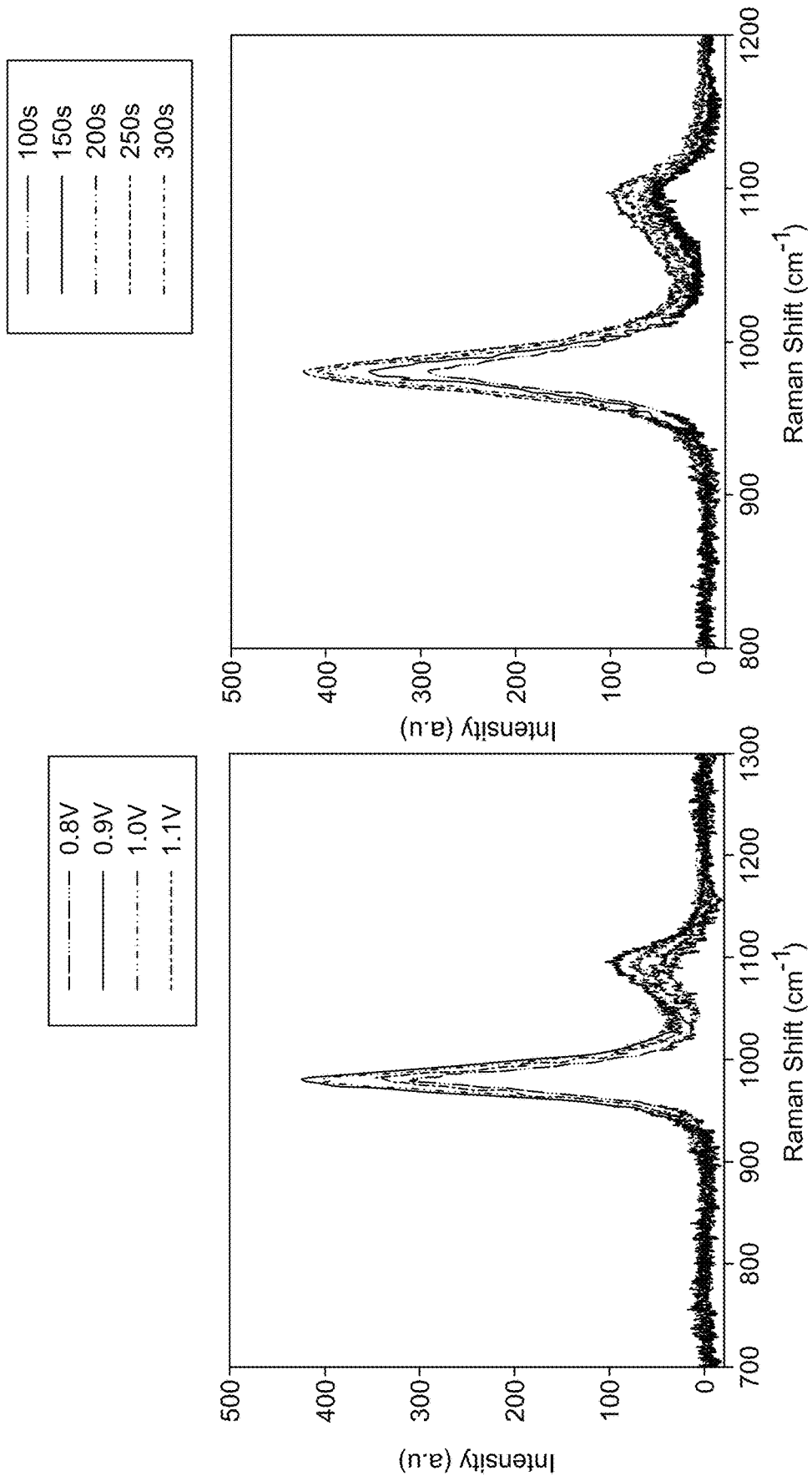
FIG. 5A shows Raman spectra of in-situ electrochemical pre-concentrated solution of 0.1 M HC drug at different potentials, using electrochemical stripping voltammetry, in a phosphate buffer, according to certain embodiments.
FIG. 5B shows Raman spectra of the in-situ electrochemical pre-concentrated solution of 0.1 M HC drug at different times, using the electrochemical stripping voltammetry, in phosphate buffer, according to certain embodiments.

The CV (FIG. 4A) were recorded for bare and functionalized substrates as working electrodes in the presence of a K$_3$[Fe(CN)$_6$] redox probe at a scan rate of 80 mV/sec. The increase in the anodic and cathodic peak currents, and the slight decrease in the peak potential separation, were both noticed in the modified electrode, indicating that an electron transfer activity was favorable at the fabricated FTO electrode. The EIS spectra (FIG. 4B) recorded in the redox probe showed a faster electron transfer process for the CNPs/FTO with a charge transfer resistance (R$_{ct}$) of 1.1 kΩ. In comparison, the bare substrate encountered a lower magnitude of charge transfer with an R$_{ct}$ value of 6.2 kΩ. It confirmed that Au-coated CuO$_x$ nanoplates employed for the electrode fabrication significantly increased the electrochemical activity, reinforcing the CV findings. The EC-SERS investigation was carried out in a cell containing a three-electrode system. The in-situ electrochemical pre-concentration of the anti-cancer drug HC on the SERS substrate was optimized in terms of electrical potential and time to obtain the best possible response at the Raman peak centered at 977 cm$^{-1}$. The oxidation of HC was reported at 0.9 V vs. Ag/AgCl. Therefore, the preconcentration potential for HC was selected at 0.8, 0.9, 1.0, and 1.1V potential. The highest Raman response (FIG. 5A) was achieved at 0.9 V. The pre-concentration time at the optimum potential was further varied (FIG. 5B), and the maximum Raman enhancement was achieved at 250 sec. These highest signal conditions were employed for the EC-SERS analysis of HC.

Figure 6A:
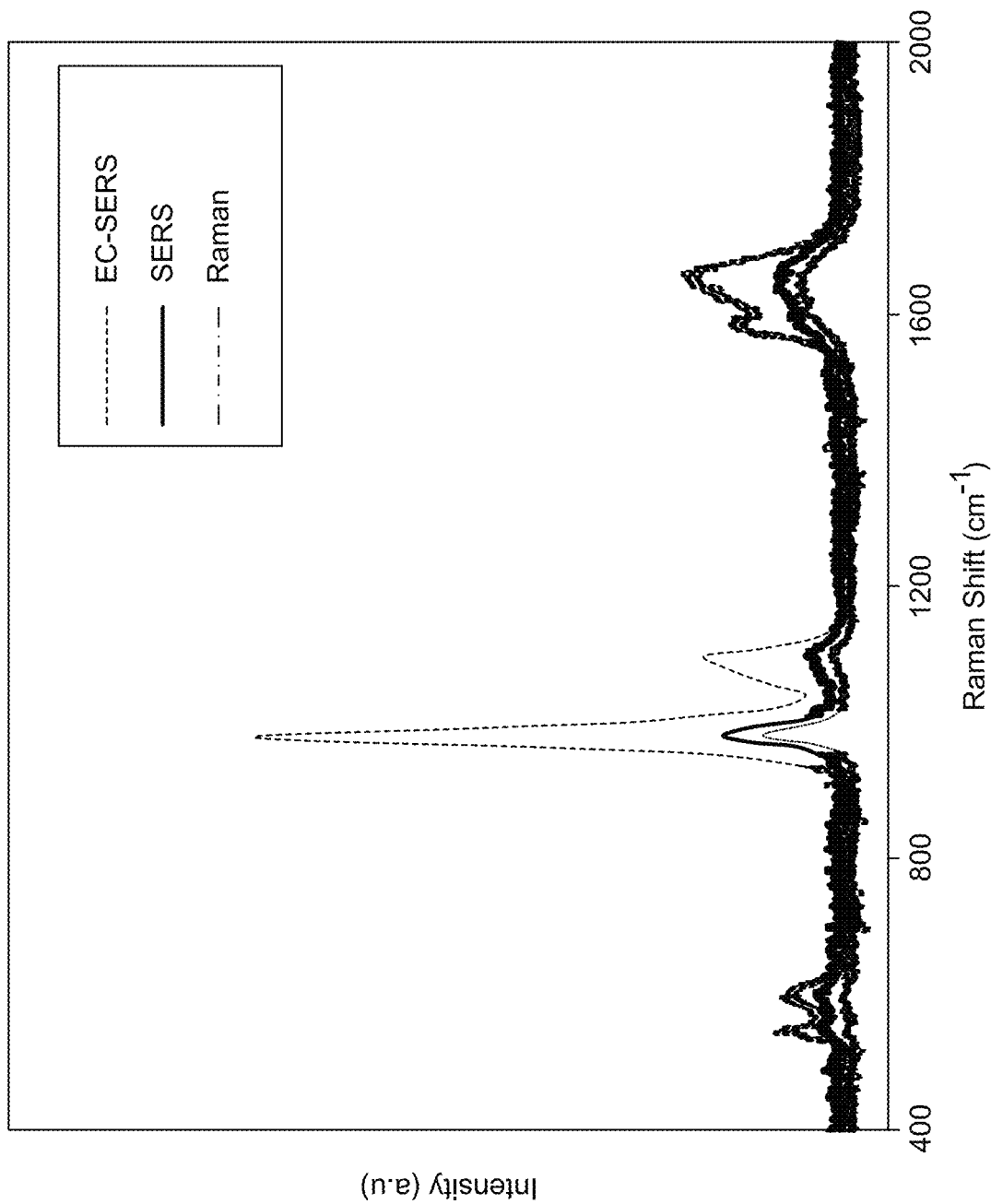
FIG. 6A shows a normal Raman, Surface-Enhanced Raman Spectroscopy (SERS), and Electrochemical Surface-Enhanced Raman spectroscopy (EC-SERS) spectra using 0.1 M HC solution, according to certain embodiments.
Figure 6B:
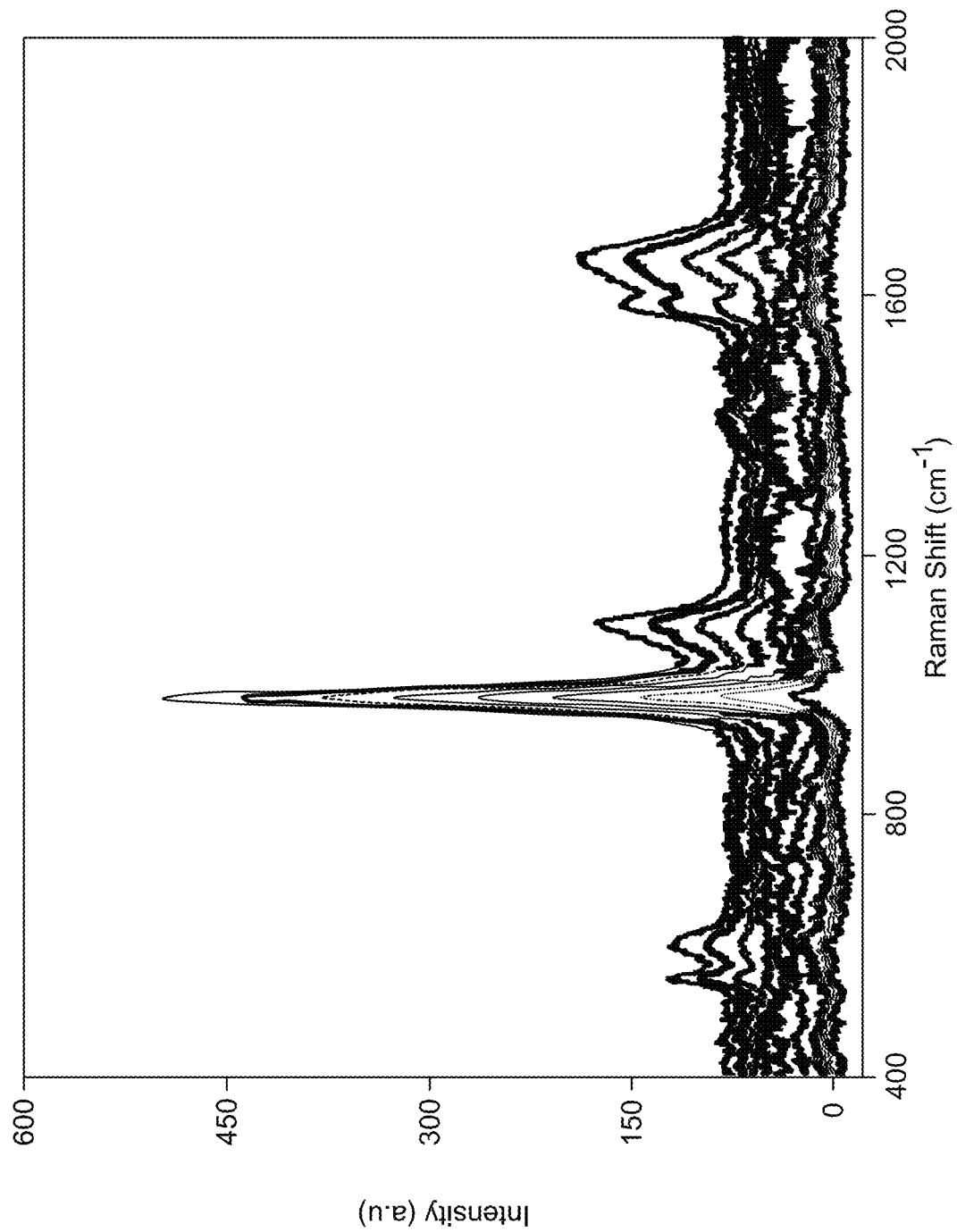
FIG. 6B shows EC-SERS response at different HC concentrations ($0.1$-$10^{-9}$ M) in phosphate buffer (pH=7), according to certain embodiments.
Figure 6C:
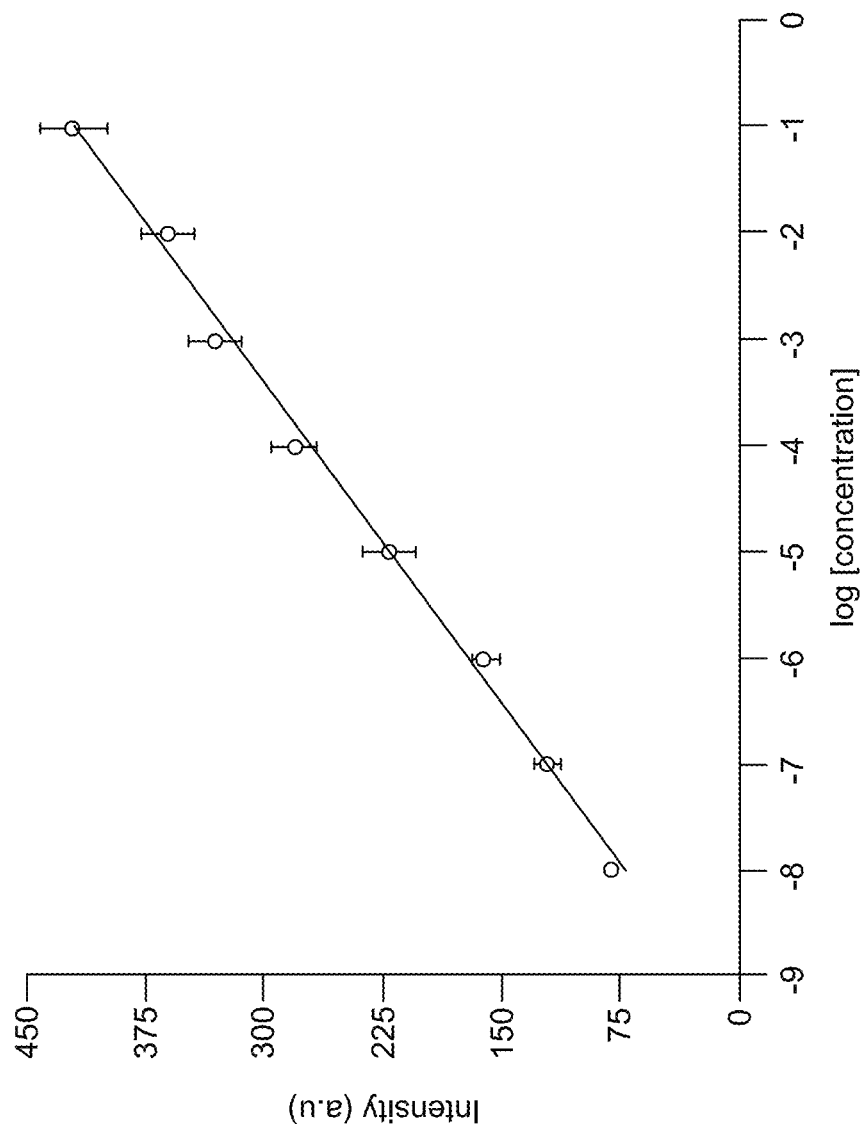
FIG. 6C shows the EC-SERS linear response with the logarithmic concentration of HC.

The Raman, SERS, and EC-SERS spectra of 0.1 M HC in standard phosphate buffer solution (pH=7) were recorded at the optimum spectroscopic and electrochemical conditions, as illustrated in FIG. 6A. The enhancement in Raman signals was observed after employing nanoparticle substrates with a 1:1 volume ratio of Au—CuO$_x$ CNPs and anti-cancer HC drug. Moreover, a considerable enhancement was noticed upon applying the electrochemical pre-concentration method using the Au—CuO$_x$/FTO electrode as an EC-SERS active substrate. The prominent Raman line at 977 cm$^{-1}$ attributed to the C—N stretching vibration was selected for the HC concentration-dependent response. The EC-SERS responses were screened at the previously described conditions in the drug concentration region 0.1 M-10$^{-8}$ M. A spectral 400-2000 cm$^{-1}$ range was recorded and shown in FIG. 6B. The Raman intensity corresponding to the C—N stretching mode correlates well with the HC species in an aqueous solution. A wide linear dynamic range of 0.1 M-10 nM was achieved, as presented in the inset of FIG. 6B. The EC-SERS protocol yielded a competitively low detection limit of 1.0 nM with a correlation coefficient value R$^2$=0.9954. The Raman enhancement factor (EF), a key parameter reflecting the magnitude of intensity enhancement capability by the nanomaterial, was calculated following a well-established method.

Raman enhancement factor represents the Raman enhancement property which was calculated by using equation (la) (P. Reokrungruang, I. Chatnuntawech, T. Dharakul, S. Bamrungsap, A simple paper-based surface enhanced Raman scattering (SERS) platform and magnetic separation for cancer screening, Sensors Actuators, B Chem. 285 (2019) 462-469, incorporated herein by reference in its entirety).

$$EF = \frac{I_{EC-SERS}}{I_{Raman}} \times \frac{C_{Raman}}{C_{SERS}} \tag{1a}$$

where I$_{EC-SERS}$=EC-SERS intensity of characteristic HC molecule peak on in Au—CuOx modified FTO, I$_{Raman}$=Raman intensity of characteristic peak of HC solution, C$_{EC-SERS}$=the concentration of HC on Au—CuO$_x$ modified FTO, C$_{Raman}$=The concentration of HC solution. The characteristic peaks at 977 cm$^{-1}$ was selected for Raman enhancement calculation. EF of the process was found to be 1.43×10$^7$, which implies that Au—CuO$_x$ CNPs can be considered a promising substrate for SERS and EC-SERS application.

The transfer of charges (CT) and surface plasmon resonance (SPR) is important in understanding the Raman enhancement process. To estimate contributions from CT and SPR in the EC-SERS enhancement of HC Raman peaks, the concept of "degree of CT ρCT" introduced by Lombardi et al. [J. R. Lombardi, R. L. Birke, A unified view of surface-enhanced Raman scattering, Acc. Chem. Res. 42 (2009) 734-742], incorporated herein by reference in its entirety, was employed using the following equation:

$$\rho_{CT(k)} = \frac{I_{(CT)}^k - I_{(SPR)}^k}{I_{(CT)}^k - I_{(SPR)}^0}. \tag{1}$$

In Eq. (1), k is an index identifying the individual molecular lines in the Raman spectrum. Two Raman peaks from the EC-SERS spectra were chosen for a better understanding of the nature of enhancement facilitated by the HC . . . Au—CuO$_x$ complex. The Raman peak corresponding to a symmetric is associated with the surface plasmon response (SPR) effect, and its intensity is denoted as I$^0$ (SPR). For a symmetric line, $I^k$ (SPR)=$I^0$ (SPR). On the other hand, the second selected peak is regarded as non-totally symmetric, and its intensity is presented by $I^k$ (CT), whose intensity is enhanced by the contribution of the CT resonance. The $I^k$ (SPR) value is normally small or zero. Then, eq. (1) can be modified in the following form [X. Fu, T. Jiang, Q. Zhao, H. Yin, Charge-transfer contributions in surface-enhanced Raman scattering from Ag, Ag2S and Ag$_2$Se substrates, J. Raman Spectrosc. 43 (2012) 1191-1195], incorporated herein by reference in its entirety:

$$\rho_{CT} = \frac{R}{1+R}. \quad (2)$$

Figure 14B:
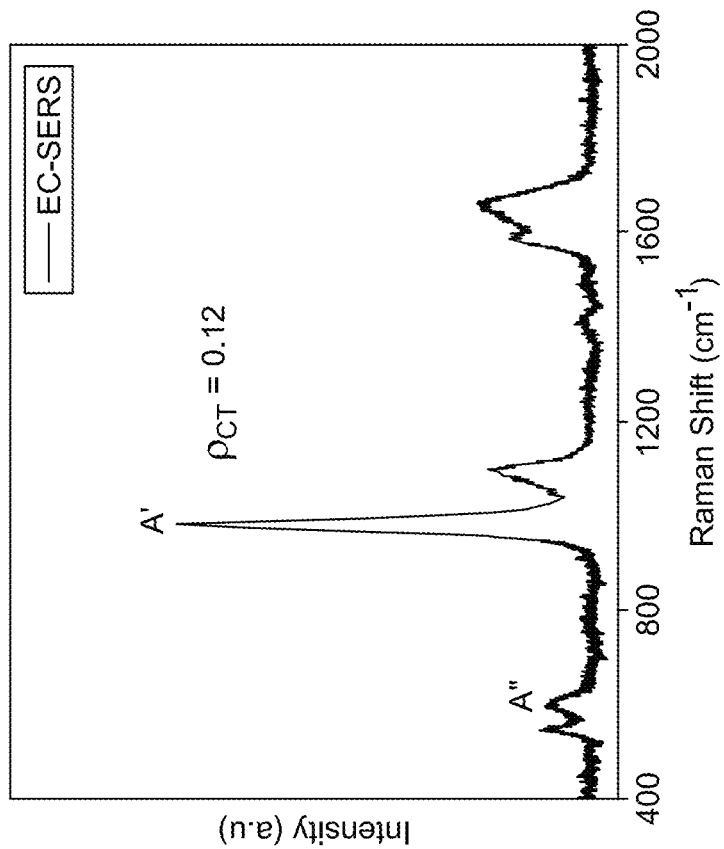
FIG. 14A-B show experimental (A) SERS and (B) EC-SERS spectra of hydroxycarbamide/Au—$CuO_x$-CNPs solutions labelled with totally symmetric (A') and non-totally symmetric (A") modes, according to certain embodiments.
Figure 14A:
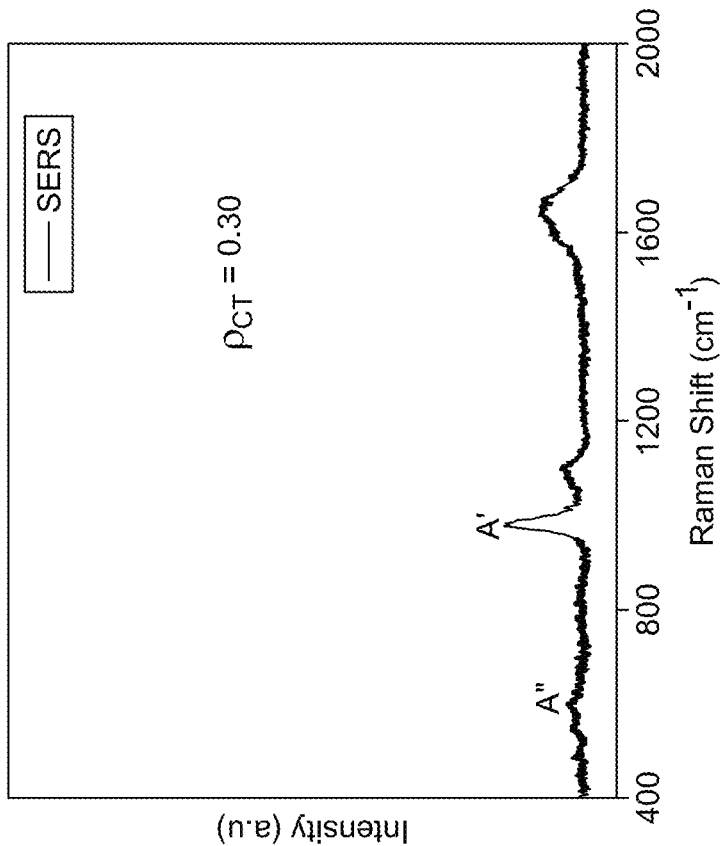

In equation (2), R is the intensity ratio of the non-totally symmetric mode to the totally symmetric mode in the Raman spectrum. To suitably determine the non-totally symmetric and totally symmetric vibrations, the optimized $C_s$ structure of HC was used to generate the vibrational frequencies in the layout of A' and A" modes, where the formers describe the totally symmetric while the latter can be regarded as non-totally symmetric. The most prominent totally and non-totally symmetric lines, hence, are identified at 545 cm$^{-1}$ (476 cm$^{-1}$ from DFT) and 977 cm$^{-1}$ (926 cm$^{-1}$ from DFT), respectively, in the SERS and EC-SERS spectra (FIG. 14A-B). These lines were chosen because they are comparatively intense and separate from each other. It can be concluded from Eq. (1) that when $\rho_{CT} \rightarrow 0$, there is a negligible or zero contribution due to charge transfer, while when $\rho_{CT} \rightarrow 1$, charge transfer contribution dominates. Further, the contribution from CT and SPR will be about equal when $\rho_{CT}$=0.5. The values of ρ revealed from the EC-SERS, and SERS spectra are 0.12 and 0.30, respectively. In both cases, the SPR phenomenon was the major contributor to the SERS and EC-SERS enhancements caused by the drug/CNPs complex. Moreover, it can be noticed that the plasmonic resonance properties of the material were improved three-fold upon the incorporation of the electrochemical module, which indicates the influence of the electrochemical factor in accomplishing more sensitive, highly effective plasmonic SERS biosensors.

Although charge transfer is not the major contributor to the enhanced Raman signals, the dependability of the electron transfer on the oxidation state of the copper metal would help better understand the properties of the CNP material. Hence, the interaction of drug molecules on the nanostructured surface was assessed by calculating the amount of charge transfer. Interaction of two chemical systems having different electronegativities results in an electron flow from a system with a lower electronegativity to a system with a higher electronegativity until chemical potentials of both systems become even. The electron fraction (ΔN) transferred from the HC molecule to the nanostructured material was evaluated accordingly using the flowing equation:

$$\Delta N = \frac{[\chi_{Au-CuOx} - \chi_{HC}]}{2[\eta_{Au-CuOx} + \eta_{HC}]}, \quad (3)$$

where $\eta_{Au-CuOx}$, $\eta_{HC}$, $\chi_{Au-CuOx}$, and $\chi_{HC}$ denote absolute values of hardness and electronegativities, respectively, for the Au-loaded copper oxide and drug molecules. The hardness and electronegativity values were computed for the optimized Au—CuO, Au—Cu$_2$O, and HC configurations (Table 1). The fraction of transferred electrons from the HC molecule to Au—CuO and Au—Cu$_2$O was 0.069 and 0.131, respectively. In the Au—CuO$_x$—HC system, it is anticipated that Au—Cu$_2$O contributes twice as much to the electron transfer compared to the Cu(II) based material. The positive magnitude of ΔN implied that the drug molecule acts as an electron donor in both cases. These results support the assertion that adsorption of HC on the nanostructured surface occurs based on electron donor-acceptor interaction.

TABLE 1

Electronegativity, hardness, and electron fraction of anti-cancer drug, Au—Cu$_2$O, and Au—CuO

| Compound | Electronegativity (χ) eV | Hardness (η) eV | Electron Fraction (ΔN) |
|---|---|---|---|
| HC | 3.74 | 3.279 | — |
| Au—Cu$_2$O | 4.959 | 1.385 | 0.131 |
| Au—CuO | 4.413 | 1.572 | 0.069 |

Figures 7A, 7B, 7C:
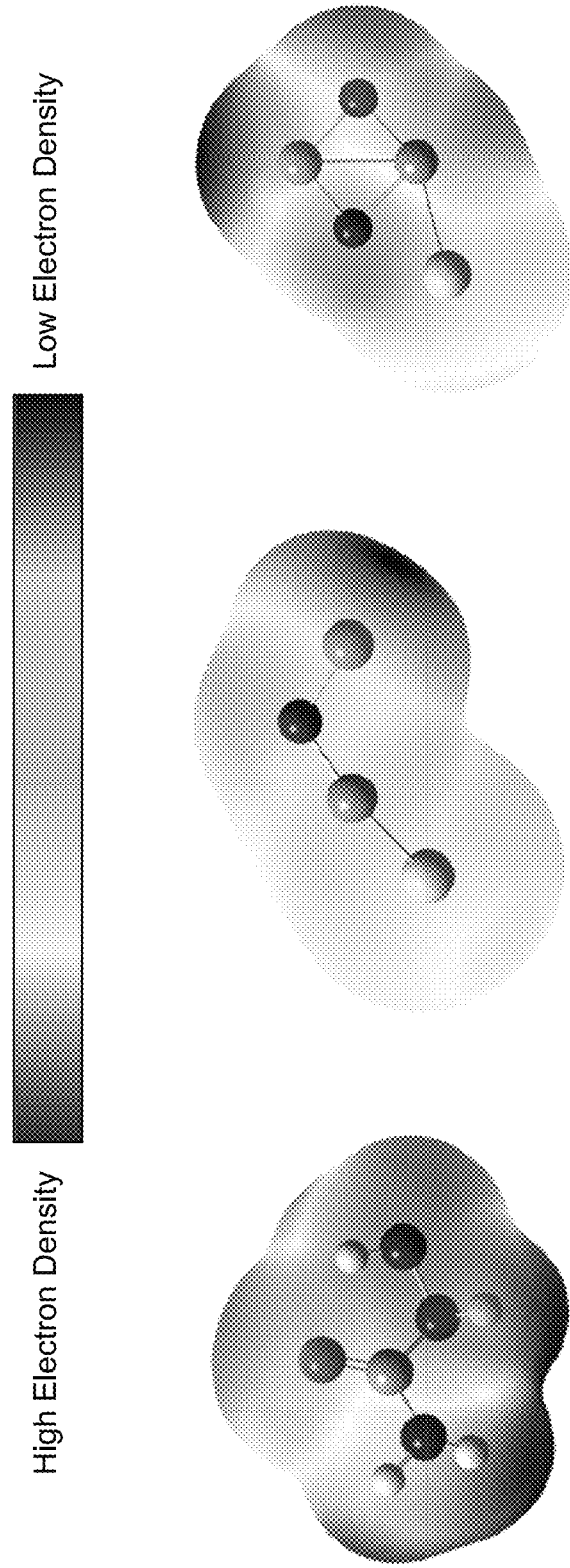
FIG. 7A shows an electrostatic potential (ESP) map of the HC, according to certain embodiments.
FIG. 7B shows an ESP map of Au—$Cu_2O$, according to certain embodiments.
FIG. 7C shows an ESP map of Au—CuO nanoclusters with an isovalue=0.02, according to certain embodiments.
Figure 8D:
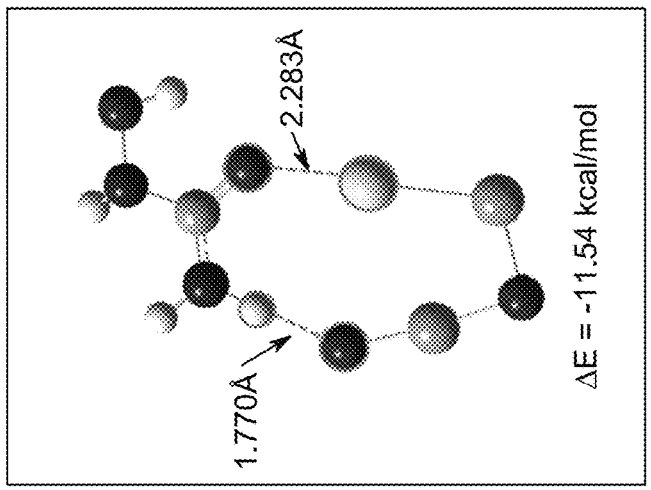
FIG. 8D shows configurations, calculated bond distances and adsorption energies for interaction models of $H_2N$ . . . CuO—Au . . . O=C computed at the DFT/B3LYP level with basis sets 6-311 g (d,p) for non-metallic atoms and SDD for metallic atoms, according to certain embodiments.
Figure 8C:
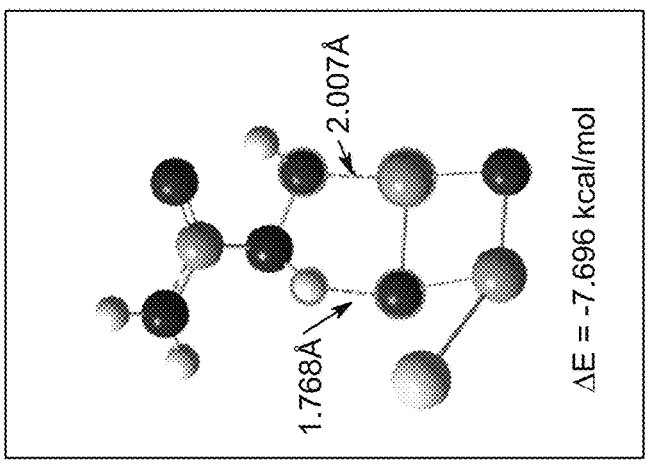
FIG. 8C shows configurations, calculated bond distances and adsorption energies for interaction models of NH . . . CuO—Au . . . OH, computed at the DFT/B3LYP level with basis sets 6-311 g (d,p) for non-metallic atoms and SDD for metallic atoms, according to certain embodiments.
Figure 8B:
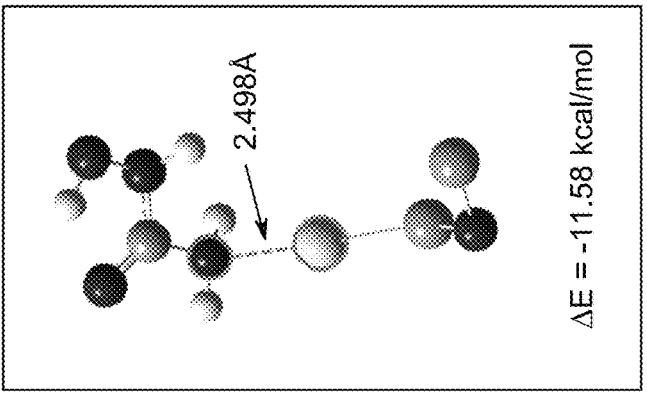
FIG. 8B shows configurations, calculated bond distances and adsorption energies for interaction models of $Cu_2O$—Au . . . $NH_2$, computed at the DFT/B3LYP level with basis sets 6-311 g (d,p) for non-metallic atoms and SDD for metallic atoms, according to certain embodiments.
Figure 8A:
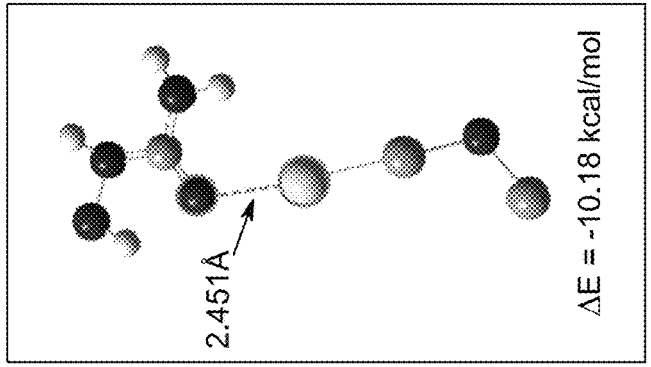
FIG. 8A shows configurations, calculated bond distances, and adsorption energies for interaction models of $Cu_2O$—Au . . . O=C, computed at the DFT/B3LYP level with basis sets 6-311 g(d,p) for non-metallic atoms and SDD for metallic atoms, according to certain embodiments.

Before exploring the nature of the interaction of HC with the nanomaterial, the electrostatic potential maps associated with the HC molecule and the Au—CuO$_x$ clusters were computed (FIG. 7). ESP analysis provides information on the electrophilicity and nucleophilicity of the adsorption system. Three potential local negative sites were found on the surface of the adsorbed molecule. These are located at the oxygen atoms of the carbonyl and hydroxyl groups and the nitrogen atom of the amino moiety. On the other hand, the four positive local regions were predicted in the vicinities of H atoms of amino and hydroxyl groups. The computed electrostatic map of the Au—CuO$_x$ complex is depicted in FIGS. 7B and 7C, in which Au and Cu transition metals were predicted to behave as electropositive electron receptors, while oxygens were confirmed to represent the electronegative regions. The detailed view of the ESP maps proposed potential interaction sites between the nanomaterial and the adsorbate drug molecule, supporting the general trend depicted above by the calculated electron transfer.

Based on the hotspots revealed from the molecular ESP maps, possible drug . . . substrate interaction modes were identified, and the respective optimized geometries were obtained, as illustrated in FIG. 8. The adsorption energies associated with the complexation of Au—CuO$_x$ with HC drug in the modes of Cu$_2$O—Au . . . O═C (FIG. 8A), Cu$_2$O—Au . . . NH$_2$ (FIG. 8B), NH . . . CuO—Au . . . OH (FIG. 8C), and H$_2$N . . . CuO—Au . . . O═C (FIG. 8D) were computed to be −10.2, −11.6, −7.7 and −11.5 kcal/mol, respectively. At the same time, their corresponding binding distances are predicted as 2.45, 2.49, 2.01, and 2.29 A$^0$, respectively. The negative interaction values and the moderately short intermolecular distances indicate energetically favorable adsorption of drug molecules on the surface of metallic nanomaterials. In the mode of interaction of HC with Au—CuO, H-bonding occurring between the H atom of HC drug and O atom of Au—CuO along with the metallic interaction was observed and thought to play a role in achieving the desirable enhancement level in Raman signals. In the NH . . . CuO—Au . . . OH interaction mode, the drug molecule interacts with the bimetallic system via copper, which hints at a possible role of Cu metal in the adsorption process. It was observed that the geometry of the Au—CuO cluster is distorted due to H-bonding between the amino group hydrogen and nanomaterial oxygen in the double interaction H$_2$N . . . CuO—Au . . . O═C model. Thus, the adsorption of drug molecules on the surface of the bimetallic nanomaterials occurs via both metals (i.e., Au and Cu) and is facilitated with H-bonding. Therefore, both metals exhibit a role in plasmonic Raman enhancement.

Figure 9:
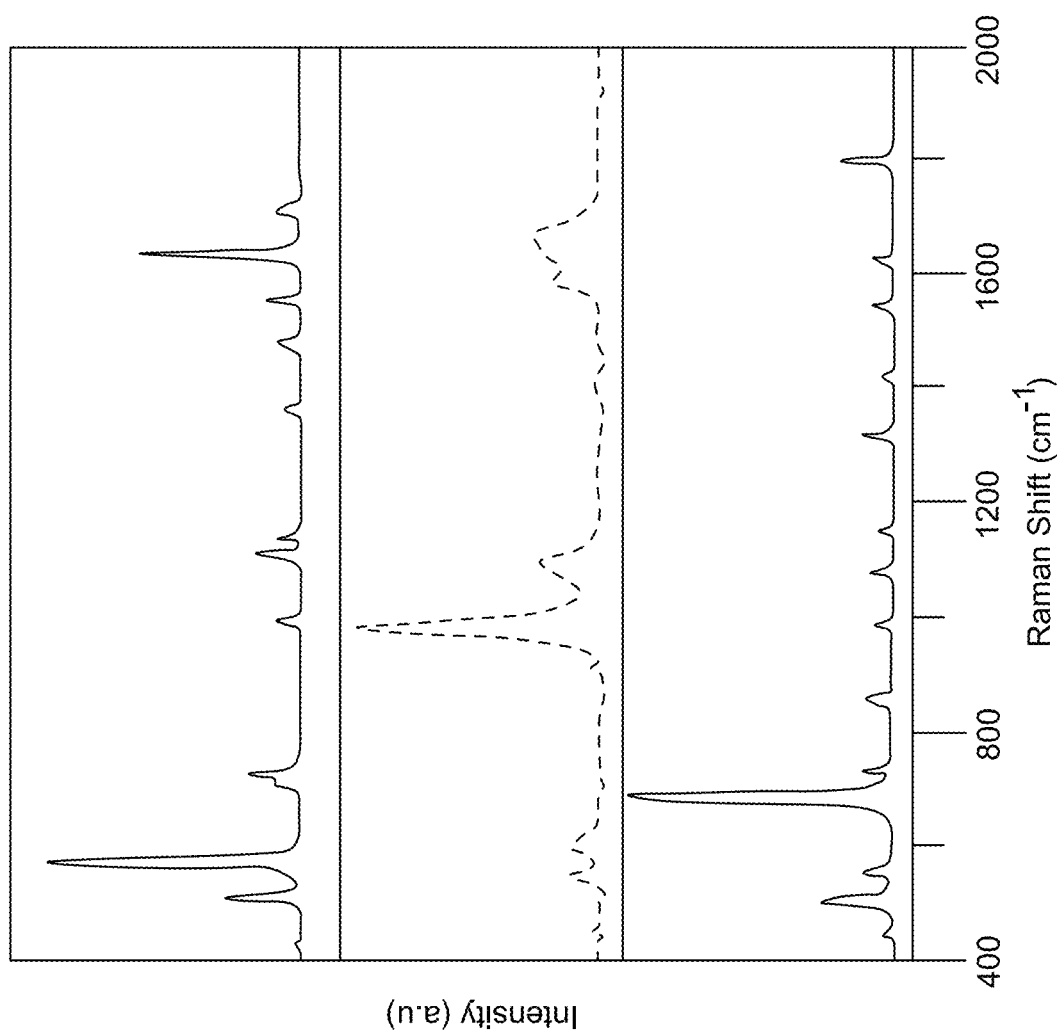
FIG. 9 shows simulated SERS spectra of $Cu_2O$—Au . . . $NH_2$, $H_2N$ . . . CuO—Au . . . O=C complexes, compared with an experimental EC-SERS spectrum (0.1 M solution of HC) under optimum conditions, according to certain embodiments.
Figure 10:
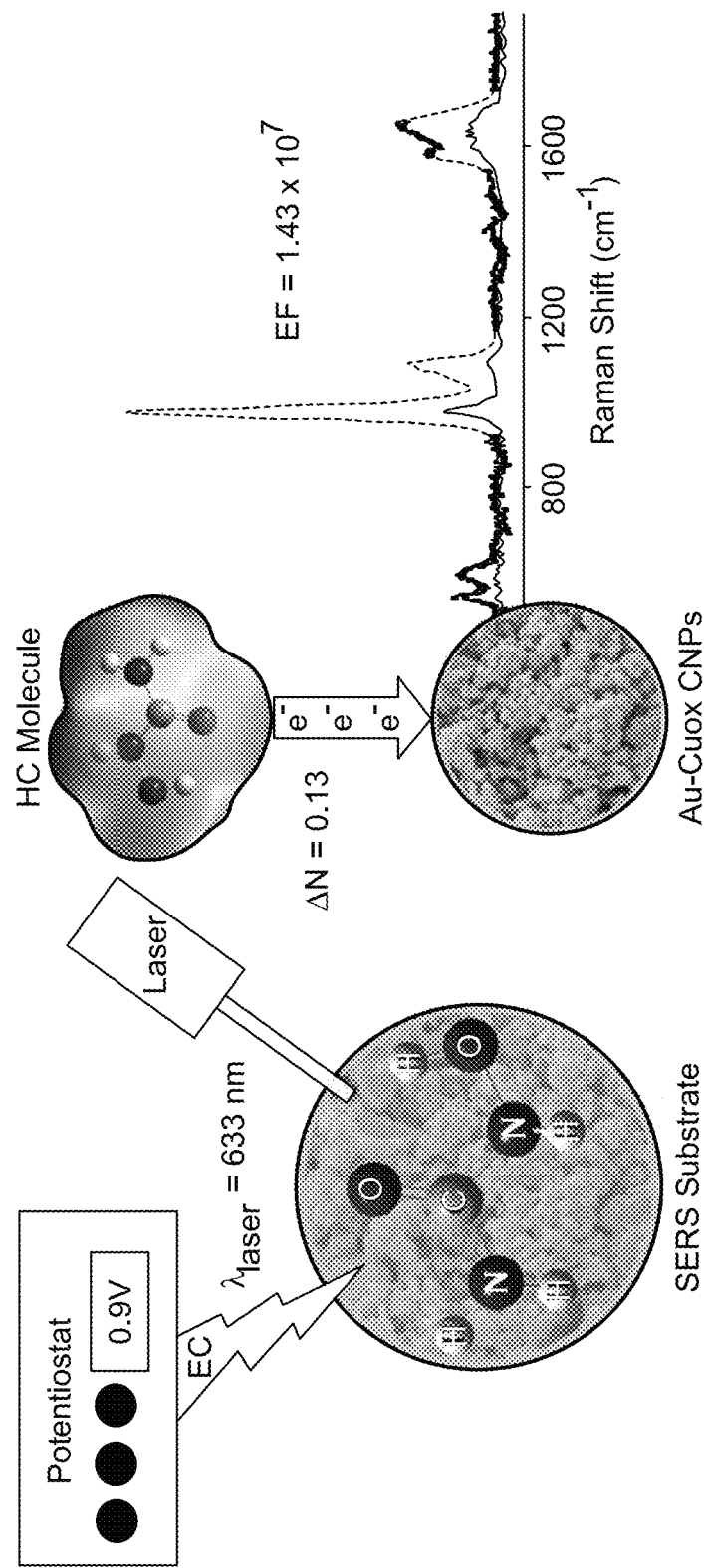
FIG. 10 is a schematic illustration depicting a method of detecting hydroxycarbamide in a solution, according to certain embodiments.

The experimental and theoretical Raman spectral profiles of HC were compared, as presented in FIG. 9. The comparison provided a basis to assign key SERS peaks originating from the most involved vibrational modes, which led to the electromagnetic field-based interaction. The experimental SERS spectra show six prominent Raman peaks at 545 $cm^{-1}$, 599 $cm^{-1}$, 977 $cm^{-1}$, 1095 $cm^{-1}$, 1587 $cm^{-1}$ and 1661 $cm^{-1}$ ascribed by the NCN bending, CN stretching, NO stretching, $H_2N$ wagging, $H_2N$ scissoring and CO stretching, respectively. The simulated SERS spectra that are most consistent with the experimental one (FIG. 9) are those resulting from the interaction of the drug molecules via single $Cu_2O$—Au . . . $NH_2$ and double $H_2N$ . . . CuO—Au . . . O=C mode complexes.

The CNPs of the Au-loaded copper oxide with enhanced SPR characteristics were synthesized in a single-step procedure and investigated for possible Raman enhancement in an EC-SERS platform. Electrochemical stripping voltammetry was incorporated with SERS, and the synergic effect for detecting the anti-cancer drug HC was tested by fabricating the CNPs on a conductive glass support. The electrochemically induced SERS technique successfully achieved a notably low detection limit and a wide dynamic working range. A highly linear response of the Raman intensity with the logarithmic HC concentration in the range of 0.1 M-$10^{-8}$ M was recorded. The detection limit was 1.0 nM, lower than previously reported analytical methods. It can be concluded that EC-based pre-concentration methods, when properly integrated with the SERS technique, would enhance the optical properties of the material substrate, and can provide reliable quantitative detection of organic-based drugs with a fast-throughput approach.

Numerous modifications and variations of the present disclosure are possible in light of the above teachings. It is therefore to be understood that within the scope of the appended claims, the invention may be practiced otherwise than as specifically described herein.

The invention claimed is:

1. A method of detecting hydroxycarbamide in a solution, comprising:
   contacting an electrochemical sensor with the solution;
   applying a potential and irradiating the electrochemical sensor in the solution; and
   measuring a Raman signal of the electrochemical sensor in the solution,
   wherein an intensity of the Raman signal correlates with an amount of hydroxycarbamide in the solution,
   wherein the electrochemical sensor comprises:
   gold coated copper oxide circular nanoplates; and
   a substrate,
   wherein the gold coated copper oxide circular nanoplates are coated on the substrate.

2. The method of claim 1, wherein the gold coated copper oxide circular nanoplates have an average diameter of 10 to 100 nm.

3. The method of claim 1, wherein the gold coated copper oxide circular nanoplates have an average diameter of 40 to 60 nm.

4. The method of claim 1, wherein the gold coated copper oxide circular nanoplates are aggregated.

5. The method of claim 4, wherein aggregates of the gold coated copper oxide circular nanoplates are at least 500 nm in size.

6. The method of claim 4, wherein aggregates of the gold coated copper oxide circular nanoplates are 500-5,000 nm in size.

7. The method of claim 1, wherein the gold coated copper oxide circular nanoplates comprise CuO and $Cu_2O$.

8. The method of claim 1, wherein a surface of the gold coated copper oxide circular nanoplates has amine, hydroxyl, and/or carbonyl groups.

9. The method of claim 1, wherein the hydroxycarbamide interacts with the gold coated copper oxide circular nanoplates via hydrogen bonding.

10. The method of claim 1, wherein the substrate is selected from the group consisting of FTO, ITO, and AZO.

11. The method of claim 1, wherein the electrochemical sensor has a charge transfer resistance of 0.5-1.5 k$\Omega$.

12. The method of claim 1, wherein the irradiating is with 600-700 nm light.

13. The method of claim 1, wherein the Raman signal is monitored from 400-2,000 $cm^{-1}$.

14. The method of claim 1, wherein a C—N bond in the Raman signal is monitored from 950-1,000 $cm^{-1}$.

15. The method of claim 1, wherein the potential is 0.7-1.1 V.

16. The method of claim 1, wherein the intensity of the Raman signal linearly correlates with the amount of hydroxycarbamide in the solution.

17. The method of claim 1, further comprising:
   quantifying the amount of hydroxycarbamide in the solution based on the intensity of the Raman signal.

18. The method of claim 1, wherein a limit of detection of hydroxycarbamide is up to 1 nM.

19. The method of claim 1, wherein a linear dynamic range of hydroxycarbamide is 0.1 M-10 nM.

* * * * *